(12) United States Patent
Van Os et al.

(10) Patent No.: US 11,481,988 B2
(45) Date of Patent: Oct. 25, 2022

(54) AVATAR EDITING ENVIRONMENT

(71) Applicant: Apple Inc., Cupertino, CA (US)

(72) Inventors: Marcel Van Os, San Francisco, CA (US); Thomas Goossens, Paris (FR); Laurent Baumann, Campbell, CA (US); Michael Dale Lampell, Woodside, CA (US); Alexandre Carlhian, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/833,436

(22) Filed: Mar. 27, 2020

(65) Prior Publication Data

US 2020/0226848 A1 Jul. 16, 2020

Related U.S. Application Data

(63) Continuation of application No. 14/866,560, filed on Sep. 25, 2015, now Pat. No. 10,607,419, which is a
(Continued)

(51) Int. Cl.
*G06T 19/20* (2011.01)
*G06T 11/60* (2006.01)
(Continued)

(52) U.S. Cl.
CPC ............ *G06T 19/20* (2013.01); *G06F 3/0482* (2013.01); *G06F 3/04812* (2013.01);
(Continued)

(58) Field of Classification Search
None
See application file for complete search history.

(56) References Cited

U.S. PATENT DOCUMENTS

| 4,847,819 A | 7/1989 | Hong |
| 4,945,521 A | 7/1990 | Klaus |

(Continued)

FOREIGN PATENT DOCUMENTS

| AU | 2015101639 A4 | 12/2015 |
| AU | 2017100683 B4 | 1/2018 |

(Continued)

OTHER PUBLICATIONS

"[B612] Addition of facial recognition bear/cat stamps and AR background function having moving sparkles or hearts", Available Online at: <URL, htpps://apptopi.jp/2017/01/22/b612>, Jan. 22, 2017, 11 pages (Official Copy Only) {See communication under Rule 37 CFR § 1.98(a) (3)}.

(Continued)

*Primary Examiner* — Edward Martello
(74) *Attorney, Agent, or Firm* — Dentons US LLP

(57) ABSTRACT

An avatar editing environment is disclosed that allows users to create custom avatars for use in online games and other applications. Starting with a blank face the user can add, rescale and position different elements (e.g., eyes, nose, mouth) on the blank face. The user can also change the shape of the avatar's face, the avatar's skin color and the color of all the elements. In some implementations, touch input and gestures can be used to manually edit the avatar. Various controls can be used to create the avatar, such as controls for resizing, rotating, positioning, etc. The user can choose between manual and automatic avatar creation. The avatar editing environment can be part of a framework that is available to applications. One or more elements of the avatar can be animated.

24 Claims, 21 Drawing Sheets

Related U.S. Application Data continuation of application No. 13/082,035, filed on Apr. 7, 2011, now Pat. No. 9,576,400.

(60) Provisional application No. 61/321,840, filed on Apr. 7, 2010.

(51) Int. Cl.

| | | |
|---|---|---|
| *G06F 3/04812* | (2022.01) | |
| *G06F 3/04817* | (2022.01) | |
| *G06F 3/0482* | (2013.01) | |
| *G06F 3/04845* | (2022.01) | |
| *G06F 3/04883* | (2022.01) | |
| *G06T 11/00* | (2006.01) | |
| *G06T 13/40* | (2011.01) | |
| *G06T 15/04* | (2011.01) | |

(52) U.S. Cl.
CPC ...... *G06F 3/04817* (2013.01); *G06F 3/04845* (2013.01); *G06F 3/04883* (2013.01); *G06T 11/001* (2013.01); *G06T 11/60* (2013.01); *G06T 13/40* (2013.01); *G06T 15/04* (2013.01); *G06T 2200/24* (2013.01); *G06T 2219/2012* (2013.01); *G06T 2219/2016* (2013.01)

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,615,320 A | 3/1997 | Lavendel |
| 5,825,352 A | 10/1998 | Bisset et al. |
| 5,835,079 A | 11/1998 | Shieh |
| 5,880,411 A | 3/1999 | Gillespie |
| 6,084,598 A | 7/2000 | Chekerylla |
| 6,188,391 B1 | 2/2001 | Seely et al. |
| 6,310,610 B1 | 10/2001 | Beaton et al. |
| 6,323,846 B1 | 11/2001 | Westerman et al. |
| 6,453,294 B1 | 9/2002 | Dutta et al. |
| 6,545,682 B1 | 4/2003 | Ventrella et al. |
| 6,621,524 B1 | 9/2003 | Iijima et al. |
| 6,690,376 B1 | 2/2004 | Saito et al. |
| 6,690,387 B2 | 2/2004 | Zimmerman et al. |
| 6,873,610 B1 | 3/2005 | Noever |
| 7,015,894 B2 | 3/2006 | Morohoshi |
| 7,180,524 B1 | 2/2007 | Axelrod |
| 7,184,064 B2 | 2/2007 | Zimmerman et al. |
| 7,227,976 B1 | 6/2007 | Jung et al. |
| 7,386,799 B1 | 6/2008 | Clanton et al. |
| 7,484,176 B2 | 1/2009 | Blattner et al. |
| 7,487,458 B2 | 2/2009 | Jalon et al. |
| 7,603,413 B1 | 10/2009 | Herold et al. |
| 7,636,755 B2 | 12/2009 | Blattner et al. |
| 7,663,607 B2 | 2/2010 | Hotelling et al. |
| 7,697,960 B2 | 4/2010 | Seo et al. |
| 7,751,285 B1 | 7/2010 | Cain et al. |
| 7,761,339 B2 | 7/2010 | Alivandi |
| 7,827,495 B2 | 11/2010 | Bells et al. |
| 7,895,049 B2 | 2/2011 | Osullivan et al. |
| 7,908,554 B1 | 3/2011 | Blattner |
| 7,921,066 B2 | 4/2011 | Van et al. |
| 7,979,574 B2 | 7/2011 | Gillo et al. |
| 8,026,918 B1 | 9/2011 | Murphy |
| 8,037,147 B1 | 10/2011 | Herold et al. |
| 8,047,988 B2 | 11/2011 | Lee et al. |
| 8,088,044 B2 | 1/2012 | Tchao et al. |
| 8,156,060 B2 | 4/2012 | Borzestowski et al. |
| 8,169,438 B1 | 5/2012 | Baraff et al. |
| 8,234,218 B2 | 7/2012 | Robinson et al. |
| 8,250,144 B2 | 8/2012 | Blattner et al. |
| 8,295,546 B2 | 10/2012 | Craig et al. |
| 8,384,719 B2 | 2/2013 | Reville et al. |
| RE44,054 E | 3/2013 | Kim |
| 8,402,378 B2 | 3/2013 | Blattner et al. |
| 8,423,089 B2 | 4/2013 | Song et al. |
| 8,439,750 B2 | 5/2013 | Kawamoto |
| 8,473,848 B2 | 6/2013 | Bells et al. |
| 8,479,122 B2 | 7/2013 | Hotelling et al. |
| 8,692,830 B2 | 4/2014 | Nelson et al. |
| 8,694,899 B2 | 4/2014 | Goossens et al. |
| 8,896,652 B2 | 11/2014 | Ralston |
| 9,094,576 B1 | 7/2015 | Karakotsios |
| 9,153,031 B2 | 10/2015 | El-Saban et al. |
| 9,207,837 B2 | 12/2015 | Paretti et al. |
| 9,230,241 B1 | 1/2016 | Singh et al. |
| 9,230,355 B1 | 1/2016 | Ahuja et al. |
| 9,245,177 B2 | 1/2016 | Perez |
| 9,246,961 B2 | 1/2016 | Walkin et al. |
| 9,264,660 B1 | 2/2016 | Petterson et al. |
| 9,298,263 B2 | 3/2016 | Geisner et al. |
| 9,349,414 B1 | 5/2016 | Furment et al. |
| 9,411,506 B1 | 8/2016 | Marra et al. |
| 9,448,708 B1 | 9/2016 | Bennett et al. |
| 9,602,559 B1 | 3/2017 | Barros et al. |
| 9,628,416 B2 | 4/2017 | Henderson |
| 9,686,497 B1 | 6/2017 | Terry |
| 9,948,589 B2 | 4/2018 | Gonnen et al. |
| 9,949,697 B2 | 4/2018 | Iscoe et al. |
| 10,062,133 B1 | 8/2018 | Mishra et al. |
| 10,095,385 B2 | 10/2018 | Walkin et al. |
| 10,270,983 B1 | 4/2019 | Van Os et al. |
| 10,289,265 B2 | 5/2019 | Kulkarni |
| 10,325,416 B1 | 6/2019 | Scapel et al. |
| 10,325,417 B1 | 6/2019 | Scapel et al. |
| 10,375,313 B1 | 8/2019 | Van Os et al. |
| 10,376,153 B2 | 8/2019 | Tzvieli et al. |
| 10,379,719 B2 | 8/2019 | Scapel et al. |
| 10,410,434 B1 | 9/2019 | Scapel et al. |
| 10,505,726 B1 | 12/2019 | Andon et al. |
| 10,521,091 B2 | 12/2019 | Anzures et al. |
| 10,521,948 B2 | 12/2019 | Rickwald et al. |
| 10,580,221 B2 | 3/2020 | Scapel et al. |
| 10,620,590 B1 | 4/2020 | Guzman et al. |
| 10,628,985 B2 | 4/2020 | Mishra et al. |
| 10,657,695 B2 | 5/2020 | Chand et al. |
| 10,659,405 B1 | 5/2020 | Chang et al. |
| 10,698,575 B2 | 6/2020 | Walkin et al. |
| 10,708,545 B2 | 7/2020 | Rivard et al. |
| 10,789,753 B2 | 9/2020 | Miller, IV et al. |
| 10,796,480 B2 | 10/2020 | Chen et al. |
| 10,798,035 B2 | 10/2020 | Lewis et al. |
| 10,810,409 B2 | 10/2020 | Bacivarov et al. |
| 10,817,981 B1 | 10/2020 | Belkin |
| 10,845,968 B2 | 11/2020 | Scapel et al. |
| 10,902,661 B1 | 1/2021 | Mourkogiannis et al. |
| 11,061,372 B1 | 7/2021 | Chen et al. |
| 2001/0050689 A1 | 12/2001 | Park |
| 2002/0054157 A1 | 5/2002 | Hayashi et al. |
| 2002/0061781 A1 | 5/2002 | Tonomura |
| 2003/0110450 A1 | 6/2003 | Sakai |
| 2004/0075699 A1 | 4/2004 | Franchi et al. |
| 2004/0203342 A1 | 10/2004 | Sibecas et al. |
| 2004/0225966 A1 | 11/2004 | Besharat et al. |
| 2005/0026685 A1 | 2/2005 | Ruark et al. |
| 2005/0078804 A1 | 4/2005 | Yomoda |
| 2005/0124389 A1 | 6/2005 | Yang |
| 2005/0143108 A1 | 6/2005 | Seo et al. |
| 2005/0190653 A1 | 9/2005 | Chen |
| 2005/0248574 A1 | 11/2005 | Ashtekar et al. |
| 2005/0261031 A1 | 11/2005 | Seo et al. |
| 2006/0026521 A1 | 2/2006 | Hotelling et al. |
| 2006/0059430 A1 | 3/2006 | Bells et al. |
| 2006/0075053 A1 | 4/2006 | Xu et al. |
| 2006/0166708 A1 | 7/2006 | Kim et al. |
| 2006/0188144 A1 | 8/2006 | Sasaki et al. |
| 2006/0197753 A1 | 9/2006 | Hotelling |
| 2006/0294465 A1 | 12/2006 | Ronen et al. |
| 2007/0024614 A1 | 2/2007 | Tam et al. |
| 2007/0113181 A1 | 5/2007 | Blattner et al. |
| 2007/0130001 A1 | 6/2007 | Jung et al. |
| 2007/0162936 A1 | 7/2007 | Stallings et al. |
| 2007/0171091 A1 | 7/2007 | Nisenboim et al. |
| 2007/0192718 A1 | 8/2007 | Voorhees et al. |

(56) References Cited

U.S. PATENT DOCUMENTS

| | | |
|---|---|---|
| 2007/0260984 A1 | 11/2007 | Marks et al. |
| 2007/0277109 A1 | 11/2007 | Chen et al. |
| 2008/0052242 A1 | 2/2008 | Merritt et al. |
| 2008/0095470 A1 | 4/2008 | Chao et al. |
| 2008/0163074 A1 | 7/2008 | Tu |
| 2008/0201438 A1 | 8/2008 | Mandre et al. |
| 2008/0298571 A1 | 12/2008 | Kurtz et al. |
| 2009/0015593 A1 | 1/2009 | Kang et al. |
| 2009/0027337 A1 | 1/2009 | Hildreth |
| 2009/0049392 A1 | 2/2009 | Karttunen et al. |
| 2009/0066817 A1 | 3/2009 | Sakamaki |
| 2009/0077497 A1 | 3/2009 | Cho et al. |
| 2009/0144173 A1 | 6/2009 | Mo et al. |
| 2009/0144639 A1 | 6/2009 | Nims et al. |
| 2009/0147008 A1 | 6/2009 | Do et al. |
| 2009/0150778 A1 | 6/2009 | Nicol |
| 2009/0175521 A1 | 7/2009 | Shadan et al. |
| 2009/0202114 A1 | 8/2009 | Morin et al. |
| 2009/0216691 A1 | 8/2009 | Borzestowski et al. |
| 2009/0237328 A1 | 9/2009 | Gyorfi et al. |
| 2009/0251484 A1 | 10/2009 | Zhao et al. |
| 2009/0254859 A1 | 10/2009 | Arrasvuori et al. |
| 2009/0254862 A1* | 10/2009 | Viginisson .......... G06F 16/3322 715/810 |
| 2009/0281925 A1 | 11/2009 | Winter et al. |
| 2009/0297022 A1 | 12/2009 | Pettigrew et al. |
| 2009/0300513 A1 | 12/2009 | Nims et al. |
| 2009/0325701 A1 | 12/2009 | Andres Del Valle |
| 2010/0009747 A1* | 1/2010 | Reville .................. A63F 13/79 463/31 |
| 2010/0123915 A1 | 5/2010 | Kashimoto |
| 2010/0124941 A1 | 5/2010 | Cho |
| 2010/0149573 A1 | 6/2010 | Pat et al. |
| 2010/0153847 A1 | 6/2010 | Fama |
| 2010/0188426 A1 | 7/2010 | Ohmori et al. |
| 2010/0203968 A1 | 8/2010 | Gill et al. |
| 2010/0211899 A1 | 8/2010 | Fujioka |
| 2010/0257469 A1 | 10/2010 | Kim et al. |
| 2010/0277470 A1 | 11/2010 | Margolis |
| 2010/0302395 A1 | 12/2010 | Mathe et al. |
| 2010/0317410 A1 | 12/2010 | Song et al. |
| 2011/0007174 A1 | 1/2011 | Bacivarov et al. |
| 2011/0072394 A1 | 3/2011 | Victor et al. |
| 2011/0074807 A1 | 3/2011 | Inada et al. |
| 2011/0161837 A1 | 6/2011 | Betzler et al. |
| 2011/0221755 A1 | 9/2011 | Geisner et al. |
| 2011/0248992 A1 | 10/2011 | Van et al. |
| 2011/0249073 A1 | 10/2011 | Cranfill et al. |
| 2011/0249078 A1 | 10/2011 | Abuan et al. |
| 2011/0252344 A1 | 10/2011 | Van Os |
| 2011/0256848 A1 | 10/2011 | Bok et al. |
| 2011/0292051 A1 | 12/2011 | Nelson et al. |
| 2011/0296324 A1 | 12/2011 | Goossens et al. |
| 2011/0304632 A1 | 12/2011 | Evertt et al. |
| 2012/0069028 A1 | 3/2012 | Bouguerra |
| 2012/0075328 A1 | 3/2012 | Goossens |
| 2012/0079378 A1 | 3/2012 | Goossens |
| 2012/0206452 A1 | 8/2012 | Geisner et al. |
| 2012/0256967 A1 | 10/2012 | Baldwin et al. |
| 2012/0293686 A1 | 11/2012 | Karn et al. |
| 2012/0299945 A1 | 11/2012 | Aarabi |
| 2012/0309520 A1 | 12/2012 | Evertt et al. |
| 2012/0314047 A1 | 12/2012 | Kasahara et al. |
| 2013/0038759 A1 | 2/2013 | Jo et al. |
| 2013/0101164 A1 | 4/2013 | Leclerc et al. |
| 2013/0135315 A1 | 5/2013 | Bares et al. |
| 2013/0141513 A1 | 6/2013 | Setton et al. |
| 2013/0147933 A1 | 6/2013 | Kulas et al. |
| 2013/0159900 A1 | 6/2013 | Pendharkar |
| 2013/0194378 A1 | 8/2013 | Brown |
| 2013/0198210 A1 | 8/2013 | Lee et al. |
| 2013/0201104 A1 | 8/2013 | Ptucha et al. |
| 2013/0234964 A1 | 9/2013 | Kim et al. |
| 2013/0286161 A1 | 10/2013 | Lv et al. |
| 2013/0290905 A1 | 10/2013 | Luvogt et al. |
| 2013/0293686 A1 | 11/2013 | Blow et al. |
| 2013/0305189 A1 | 11/2013 | Kim |
| 2013/0322218 A1 | 12/2013 | Burkhardt et al. |
| 2013/0342730 A1 | 12/2013 | Lee et al. |
| 2014/0055554 A1 | 2/2014 | Du et al. |
| 2014/0078144 A1 | 3/2014 | Berriman et al. |
| 2014/0137013 A1 | 5/2014 | Matas |
| 2014/0143693 A1 | 5/2014 | Goossens et al. |
| 2014/0218371 A1 | 8/2014 | Du et al. |
| 2014/0267618 A1 | 9/2014 | Esteban et al. |
| 2014/0300635 A1 | 10/2014 | Suzuki |
| 2014/0333671 A1 | 11/2014 | Phang et al. |
| 2014/0336808 A1 | 11/2014 | Taylor et al. |
| 2014/0351720 A1 | 11/2014 | Yin |
| 2014/0362091 A1 | 12/2014 | Bouaziz et al. |
| 2014/0368601 A1 | 12/2014 | Decharms |
| 2015/0033192 A1 | 1/2015 | Bohannon et al. |
| 2015/0035825 A1 | 2/2015 | Zhou et al. |
| 2015/0036883 A1 | 2/2015 | Deri et al. |
| 2015/0037545 A1 | 2/2015 | Sun |
| 2015/0043046 A1 | 2/2015 | Iwamoto |
| 2015/0058754 A1 | 2/2015 | Rauh |
| 2015/0078621 A1 | 3/2015 | Choi et al. |
| 2015/0082193 A1 | 3/2015 | Wallace et al. |
| 2015/0091896 A1 | 4/2015 | Tarquini et al. |
| 2015/0149927 A1 | 5/2015 | Walkin et al. |
| 2015/0213604 A1 | 7/2015 | Li et al. |
| 2015/0248235 A1 | 9/2015 | Offenberg et al. |
| 2015/0253740 A1 | 9/2015 | Nishijima et al. |
| 2015/0281145 A1 | 10/2015 | Ji |
| 2015/0302624 A1 | 10/2015 | Burke |
| 2015/0312182 A1 | 10/2015 | Langholz |
| 2015/0312184 A1 | 10/2015 | Langholz et al. |
| 2015/0312185 A1 | 10/2015 | Langholz et al. |
| 2015/0317945 A1 | 11/2015 | Andress et al. |
| 2015/0334075 A1 | 11/2015 | Wang et al. |
| 2015/0350141 A1 | 12/2015 | Yang et al. |
| 2015/0370529 A1 | 12/2015 | Zambetti et al. |
| 2016/0005211 A1 | 1/2016 | Sarkis et al. |
| 2016/0006987 A1 | 1/2016 | Li et al. |
| 2016/0030844 A1 | 2/2016 | Nair et al. |
| 2016/0034133 A1 | 2/2016 | Wilson et al. |
| 2016/0050169 A1 | 2/2016 | Ben Atar et al. |
| 2016/0086387 A1 | 3/2016 | Os et al. |
| 2016/0092035 A1 | 3/2016 | Crocker et al. |
| 2016/0092043 A1 | 3/2016 | Missig et al. |
| 2016/0132200 A1 | 5/2016 | Walkin et al. |
| 2016/0134840 A1 | 5/2016 | Mcculloch |
| 2016/0150215 A1 | 5/2016 | Chen et al. |
| 2016/0163084 A1 | 6/2016 | Corazza et al. |
| 2016/0217601 A1 | 7/2016 | Tsuda et al. |
| 2016/0226926 A1 | 8/2016 | Singh et al. |
| 2016/0247309 A1 | 8/2016 | Li et al. |
| 2016/0259413 A1 | 9/2016 | Anzures et al. |
| 2016/0259497 A1 | 9/2016 | Bauer et al. |
| 2016/0259498 A1 | 9/2016 | Foss et al. |
| 2016/0259499 A1 | 9/2016 | Kocienda et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0267067 A1 | 9/2016 | Mays et al. |
| 2016/0275724 A1 | 9/2016 | Adeyoola et al. |
| 2016/0284123 A1 | 9/2016 | Hare et al. |
| 2016/0327911 A1 | 11/2016 | Eim et al. |
| 2016/0328875 A1 | 11/2016 | Fang et al. |
| 2016/0370974 A1 | 12/2016 | Stenneth |
| 2017/0018289 A1 | 1/2017 | Morgenstern |
| 2017/0046065 A1 | 2/2017 | Zeng et al. |
| 2017/0082983 A1 | 3/2017 | Katzer et al. |
| 2017/0083086 A1 | 3/2017 | Mazur et al. |
| 2017/0111616 A1 | 4/2017 | Li et al. |
| 2017/0140214 A1 | 5/2017 | Matas et al. |
| 2017/0164888 A1 | 6/2017 | Matsuda et al. |
| 2017/0178287 A1 | 6/2017 | Anderson |
| 2017/0193684 A1 | 7/2017 | Du et al. |
| 2017/0206095 A1 | 7/2017 | Gibbs et al. |
| 2017/0220212 A1 | 8/2017 | Yang et al. |
| 2017/0236298 A1 | 8/2017 | Vetter |

(56) References Cited

U.S. PATENT DOCUMENTS

| | | |
|---|---|---|
| 2017/0255169 A1 | 9/2017 | Lee et al. |
| 2017/0286913 A1 | 10/2017 | Liu et al. |
| 2017/0323266 A1 | 11/2017 | Seo |
| 2017/0336926 A1 | 11/2017 | Chaudhri et al. |
| 2017/0336928 A1 | 11/2017 | Chaudhri et al. |
| 2018/0004404 A1 | 1/2018 | Delfino et al. |
| 2018/0047200 A1 | 2/2018 | O'hara et al. |
| 2018/0059903 A1 | 3/2018 | Lim et al. |
| 2018/0067633 A1 | 3/2018 | Wilson et al. |
| 2018/0074693 A1 | 3/2018 | Jones et al. |
| 2018/0081515 A1 | 3/2018 | Block et al. |
| 2018/0091732 A1 | 3/2018 | Wilson et al. |
| 2018/0095649 A1 | 4/2018 | Valdivia et al. |
| 2018/0114543 A1 | 4/2018 | Novikoff |
| 2018/0121060 A1 | 5/2018 | Jeong et al. |
| 2018/0131878 A1 | 5/2018 | Charlton et al. |
| 2018/0165862 A1 | 6/2018 | Sawaki |
| 2018/0189549 A1 | 7/2018 | Inomata |
| 2018/0191944 A1 | 7/2018 | Carbonell et al. |
| 2018/0268589 A1 | 9/2018 | Grant |
| 2018/0324353 A1 | 11/2018 | Kim et al. |
| 2018/0329587 A1 | 11/2018 | Ko et al. |
| 2018/0335927 A1 | 11/2018 | Anzures et al. |
| 2018/0335929 A1 | 11/2018 | Scapel et al. |
| 2018/0335930 A1 | 11/2018 | Scapel et al. |
| 2018/0336715 A1 | 11/2018 | Rickwald et al. |
| 2018/0349795 A1 | 12/2018 | Boyle et al. |
| 2019/0139207 A1 | 5/2019 | Jeong et al. |
| 2019/0158735 A1 | 5/2019 | Wilson et al. |
| 2019/0235748 A1 | 8/2019 | Seol et al. |
| 2019/0266807 A1 | 8/2019 | Lee et al. |
| 2019/0339847 A1 | 11/2019 | Scapel et al. |
| 2019/0342507 A1 | 11/2019 | Dye et al. |
| 2019/0347868 A1 | 11/2019 | Scapel et al. |
| 2020/0045245 A1 | 2/2020 | Van Os et al. |
| 2020/0068095 A1 | 2/2020 | Nabetani |
| 2020/0234481 A1 | 7/2020 | Scapel et al. |
| 2020/0234508 A1 | 7/2020 | Shaburov et al. |
| 2020/0285851 A1 | 9/2020 | Lin et al. |
| 2020/0380768 A1 | 12/2020 | Harris et al. |
| 2020/0380781 A1 | 12/2020 | Barlier et al. |
| 2020/0410763 A1 | 12/2020 | Hare et al. |
| 2020/0412975 A1 | 12/2020 | Al Majid et al. |
| 2021/0005003 A1 | 1/2021 | Chong et al. |
| 2021/0056769 A1 | 2/2021 | Scapel et al. |
| 2021/0058351 A1 | 2/2021 | Viklund et al. |
| 2021/0065448 A1 | 3/2021 | Goodrich et al. |
| 2021/0065454 A1 | 3/2021 | Goodrich et al. |
| 2021/0096703 A1 | 4/2021 | Anzures et al. |
| 2021/0099568 A1 | 4/2021 | Depue et al. |
| 2021/0099761 A1 | 4/2021 | Zhang |
| 2021/0152505 A1 | 5/2021 | Baldwin et al. |
| 2021/0168108 A1 | 6/2021 | Antmen et al. |
| 2021/0264656 A1 | 8/2021 | Barlier et al. |
| 2021/0335055 A1 | 10/2021 | Scapel et al. |
| 2021/0349426 A1 | 11/2021 | Chen et al. |
| 2021/0349427 A1 | 11/2021 | Chen et al. |
| 2021/0349611 A1 | 11/2021 | Chen et al. |
| 2021/0349612 A1 | 11/2021 | Triverio |
| 2021/0390753 A1 | 12/2021 | Scapel et al. |
| 2022/0070385 A1 | 3/2022 | Van Os et al. |

FOREIGN PATENT DOCUMENTS

| | | |
|---|---|---|
| AU | 2015297035 B2 | 6/2018 |
| CA | 2356232 A1 | 3/2002 |
| CN | 101055646 A | 10/2007 |
| CN | 101329707 A | 12/2008 |
| CN | 101692681 A | 4/2010 |
| CN | 101742053 A | 6/2010 |
| CN | 102035990 A | 4/2011 |
| CN | 102075727 A | 5/2011 |
| CN | 102142149 A | 8/2011 |
| CN | 102271241 A | 12/2011 |
| CN | 102298797 A | 12/2011 |
| CN | 102750070 A | 10/2012 |
| CN | 102854979 A | 1/2013 |
| CN | 103516894 A | 1/2014 |
| CN | 103703438 A | 4/2014 |
| CN | 103927190 A | 7/2014 |
| CN | 103947190 A | 7/2014 |
| CN | 104182741 A | 12/2014 |
| CN | 104246793 A | 12/2014 |
| CN | 104270597 A | 1/2015 |
| CN | 104376160 A | 2/2015 |
| CN | 104753762 A | 7/2015 |
| CN | 104952063 A | 9/2015 |
| CN | 105100462 A | 11/2015 |
| CN | 105391937 A | 3/2016 |
| CN | 105611215 A | 5/2016 |
| CN | 105611275 A | 5/2016 |
| CN | 105653031 A | 6/2016 |
| CN | 106303690 A | 1/2017 |
| CN | 107533356 A | 1/2018 |
| CN | 107924113 A | 4/2018 |
| CN | 104182741 A | 11/2021 |
| EP | 0579093 A1 | 1/1994 |
| EP | 1215867 A2 | 6/2002 |
| EP | 1429291 A1 | 6/2004 |
| EP | 1592212 A1 | 11/2005 |
| EP | 2416563 A2 | 2/2012 |
| EP | 2990887 A2 | 3/2016 |
| EP | 3026636 A1 | 6/2016 |
| EP | 3051525 A1 | 8/2016 |
| EP | 3101958 A1 | 12/2016 |
| EP | 3190563 A1 | 7/2017 |
| EP | 3211587 A1 | 8/2017 |
| EP | 2556665 B1 | 8/2018 |
| JP | 53-31170 A | 3/1978 |
| JP | 56-621 A | 1/1981 |
| JP | 3007616 U | 2/1995 |
| JP | 9-9072 A | 1/1997 |
| JP | 11-109066 A | 4/1999 |
| JP | 2090-76460 A | 3/2000 |
| JP | 2000-163031 A | 6/2000 |
| JP | 2001-273064 A | 10/2001 |
| JP | 2001-313886 A | 11/2001 |
| JP | 2002-251238 A | 9/2002 |
| JP | 2002-342033 A | 11/2002 |
| JP | 2003-219217 A | 7/2003 |
| JP | 2003-233616 A | 8/2003 |
| JP | 2004-28918 A | 1/2004 |
| JP | 2004-184396 A | 7/2004 |
| JP | 2005-521890 A | 7/2005 |
| JP | 2006-520053 A | 8/2006 |
| JP | 2007-528240 A | 10/2007 |
| JP | 2011-517810 A | 6/2011 |
| JP | 2011-209887 A | 10/2011 |
| JP | 2012-38292 A | 2/2012 |
| JP | 2013-3671 A | 1/2013 |
| JP | 2013-92989 A | 5/2013 |
| JP | 2013-97760 A | 5/2013 |
| JP | 2013-232230 A | 11/2013 |
| JP | 2014-206817 A | 10/2014 |
| JP | 2016-136324 A | 7/2016 |
| JP | 2017-527917 A | 9/2017 |
| JP | 2017-531225 A | 10/2017 |
| JP | 6240301 B1 | 11/2017 |
| JP | 6266736 B1 | 1/2018 |
| JP | 2018-514838 A | 6/2018 |
| JP | 2018-106365 A | 7/2018 |
| JP | 2018-116067 | 7/2018 |
| JP | 2019-145108 A | 8/2019 |
| JP | 2017-527917 A | 8/2021 |
| JP | 11-1109066 A | 12/2021 |
| JP | 53-31170 A | 12/2021 |
| JP | 56-621 A | 12/2021 |
| JP | 2001-273064 A | 12/2021 |
| JP | 2002-251238 A | 12/2021 |
| JP | 2003-233616 A | 12/2021 |
| JP | 2004-28918 A | 12/2021 |
| JP | 2013-3671 A | 12/2021 |
| JP | 2013-92989 A | 12/2021 |
| JP | 2013-232230 A | 12/2021 |

(56) References Cited

FOREIGN PATENT DOCUMENTS

| | | |
|---|---|---|
| JP | 3007616 U | 12/2021 |
| JP | 2000-76460 A | 4/2022 |
| JP | 2003-219217 A | 4/2022 |
| JP | 2013-97760 A | 4/2022 |
| KR | 2002-0042248 A | 6/2002 |
| KR | 10-2004-0046272 A | 6/2004 |
| KR | 10-2004-0107489 A | 12/2004 |
| KR | 10-2005-0086630 A | 8/2005 |
| KR | 10-2008-0050336 A | 6/2008 |
| KR | 10-2010-0086052 A | 7/2010 |
| KR | 10-2011-0028581 A | 3/2011 |
| KR | 10-2012-0132134 A | 12/2012 |
| KR | 10-2014-0033088 A | 3/2014 |
| KR | 10-2014-0049340 A | 4/2014 |
| KR | 10-2015-0024899 A | 3/2015 |
| KR | 10-1540544 B1 | 7/2015 |
| KR | 10-1587115 B1 | 1/2016 |
| KR | 10-2016-0016910 A | 2/2016 |
| KR | 10-2017-0081391 A | 7/2017 |
| KR | 10-2018-0017227 A | 2/2018 |
| KR | 10-2017-0091391 A | 12/2021 |
| KR | 10-2005-0086630 A | 2/2022 |
| KR | 10-2004-0107489 A | 6/2022 |
| KR | 10-2012-0132134 A | 6/2022 |
| WO | 98/40795 A1 | 9/1998 |
| WO | 2003/085460 A2 | 10/2003 |
| WO | 2007/120981 A2 | 10/2007 |
| WO | 2009/073607 A2 | 6/2009 |
| WO | 2009/114239 A1 | 9/2009 |
| WO | 2009/133710 A1 | 11/2009 |
| WO | 2012/170354 A2 | 12/2012 |
| WO | 2013/082325 A1 | 6/2013 |
| WO | 2013/152453 A1 | 10/2013 |
| WO | 2013/152454 A1 | 10/2013 |
| WO | 2013/152455 A1 | 10/2013 |
| WO | 2013/189058 A1 | 12/2013 |
| WO | 2014/094199 A1 | 6/2014 |
| WO | 2014/200734 A1 | 12/2014 |
| WO | 2015/144209 A1 | 10/2015 |
| WO | 2016/022203 A1 | 2/2016 |
| WO | 2016/022204 A1 | 2/2016 |
| WO | 2016/022205 A1 | 2/2016 |
| WO | 2016/036218 A1 | 3/2016 |
| WO | 2016/042926 A1 | 3/2016 |
| WO | 2016/045005 A1 | 3/2016 |
| WO | 2016/057062 A1 | 4/2016 |
| WO | 2016/064435 A1 | 4/2016 |
| WO | 2016/101124 A1 | 6/2016 |
| WO | 2016/101131 A1 | 6/2016 |
| WO | 2016/101132 A1 | 6/2016 |
| WO | 2016/144385 A1 | 9/2016 |
| WO | 2016/145129 A1 | 9/2016 |
| WO | 2016/161556 A1 | 10/2016 |
| WO | 2017/153771 A1 | 9/2017 |
| WO | 2017/201326 A1 | 11/2017 |
| WO | 2017/218193 A1 | 12/2017 |
| WO | 2018/006053 A1 | 1/2018 |
| WO | 2018/049430 A2 | 3/2018 |
| WO | 2018/057272 A1 | 3/2018 |
| WO | 2018/212802 A1 | 11/2018 |
| WO | 2019/216999 A1 | 11/2019 |
| WO | 2021/050190 A1 | 3/2021 |

OTHER PUBLICATIONS

Advisory Action received for U.S. Appl. No. 16/259,771, dated Feb. 26, 2020, 3 pages.
Advisory Action received for U.S. Appl. No. 16/259,771, dated Jul. 14, 2020, 6 pages.
Applicant-Initiated Interview Summary received for U.S. Appl. No. 16/259,771, dated May 5, 2020, 10 pages.
Applicant-Initiated Interview Summary received for U.S. Appl. No. 16/519,850, dated Jun. 26, 2020, 4 pages.
Certificate of Examination received for Australian Patent Application No. 2019100420, dated Jul. 3, 2019, 2 pages.
Certificate of Examination received for Australian Patent Application No. 2019100497, dated Jul. 29, 2019, 2 pages.
Certificate of Examination received for Australian Patent Application No. 2019100794, dated Dec. 19, 2019, 2 pages.
Certificate of Examination received for Australian Patent Application No. 2019101019, dated Nov. 12, 2019, 2 pages.
Certificate of Examination received for Australian Patent Application No. 2019101667, dated Mar. 20, 2020, 2 pages.
Certificate of Examination received for Australian Patent Application No. 2020100189, dated May 12, 2020, 2 pages.
Certificate of Examination received for Australian Patent Application No. 2020100675, dated Jun. 30, 2020, 2 pages.
Corrected Notice of Allowance received for U.S. Appl. No. 15/713,490, dated May 1, 2019, 2 pages.
Corrected Notice of Allowance received for U.S. Appl. No. 16/142,288, dated Jul. 30, 2019, 5 pages.
Corrected Notice of Allowance received for U.S. Appl. No. 16/143,097, dated Nov. 8, 2019, 3 pages.
Corrected Notice of Allowance received for U.S. Appl. No. 16/519,850, dated Sep. 8, 2020, 5 pages.
Decision to Grant received for Danish Patent Application No. PA201870372, dated Jun. 17, 2020, 2 pages.
Decision to Grant received for Danish Patent Application No. PA201870375, dated Jul. 24, 2019, 2 pages.
Decision to Grant received for Danish Patent Application No. PA201870377, dated May 14, 2019, 2 pages.
Enterbrain, "No. 5 Create your own Avatar Mii Studio", vol. 26, No. 11, p. 138, Feb. 24, 2011, 4 pages (Official Copy Only) {See communication under Rule 37 CFR § 1.98(a) (3)}.
European Search Report received for European Patent Application No. 19172407.9, dated Oct. 9, 2019, 4 pages.
European Search Report received for European Patent Application No. 19181242.9, dated Nov. 27, 2019, 4 pages.
European Search Report received for European Patent Application No. 20168021.2, dated Jul. 8, 2020, 4 pages.
Extended European Search Report received for European Patent Application No. 17853657.9, dated May 28, 2020, 9 pages.
Extended European Search Report received for European Patent Application No. 19204230.7, dated Feb. 21, 2020, 7 pages.
Extended European Search Report received for European Patent Application No. 19212057.4, dated Feb. 27, 2020, 8 pages.
Fedko, Daria, "AR Hair Styles", Online Available at <https://www.youtube.com/watch?v=FrS6tHRbFE0>, Jan. 24, 2017, 2 pages.
Final Office Action received for U.S. Appl. No. 16/116,221, dated Mar. 22, 2019, 35 pages.
Final Office Action received for U.S. Appl. No. 16/259,771, dated Nov. 18, 2019, 13 pages.
Flatlinevertigo, "Black Desert Online: Intro to Hair Customization", Online Available at: <https://www.youtube.com/watch?v=9MCbfd_eMEg>, Sep. 9, 2015, 3 pages.
"Here are Warez Files: Eve Online Character Creator", Online Available at: <http://theherearewarezfiles.blogspot.com/2014/03/eve-online-character-creator-download.html>, Mar. 3, 2014, 7 pages.
Intention to Grant received for Danish Patent Application No. PA201870372, dated Feb. 13, 2020, 2 pages.
Intention to Grant received for Danish Patent Application No. PA201870375, dated Jun. 3, 2019, 2 pages.
Intention to Grant received for Danish Patent Application No. PA201870375, dated Mar. 26, 2019, 2 pages.
Intention to Grant received for Danish Patent Application No. PA201870377, dated Mar. 26, 2019, 2 pages.
International Preliminary Report on Patentability received for PCT Patent Application No. PCT/US2017/049795, dated Apr. 4, 2019, 16 pages.
International Search Report and Written Opinion received for PCT Patent Application No. PCT/US2017/049795, dated Dec. 27, 2017, 26 pages.
International Search Report and Written Opinion received for PCT Patent Application No. PCT/US2019/023793, dated Aug. 27, 2019, 17 pages.

(56) References Cited

OTHER PUBLICATIONS

International Search Report and Written Opinion received for PCT Patent Application No. PCT/US2019/024067, dated Oct. 9, 2019, 18 pages.
International Search Report and Written Opinion received for PCT Patent Application No. PCT/US2020/14176, dated Mar. 26, 2020, 12 pages.
Invitation to Pay Additional Fees received for PCT Patent Application No. PCT/US2017/049795, dated Nov. 3, 2017, 3 pages.
Invitation to Pay Additional Fees received for PCT Patent Application No. PCT/US2019/023793, dated Jul. 5, 2019, 11 pages.
Invitation to Pay Additional Fees received for PCT Patent Application No. PCT/US2019/024067, dated Jul. 16, 2019, 13 pages.
Invitation to Pay Search Fees received for European Patent Application No. 19724959.2, dated Feb. 25, 2020, 3 pages.
Koti, Kotresh, "Colour with Asian Paints.A Mobail App by Android Application—2018", Available Online at <https://www.youtube.com/watch?v=M6EIO7ErYd0&feature=youtu.be&t=81>, May 6, 2018, 2 pages.
Kozak, Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.
Kyoko, Makino, "How to Make a Lookalike Face Icon for Your Friend", ASCII, Japan Weekly, ASCII Media Works Inc., vol. 24, Jul. 17, 2014, 7 pages (Official Copy Only) {See communication under Rule 37 CFR § 1.98(a) (3)}.
Lang, Brian, "How to Audio & Video Chat with Multiple Users at the Same Time in Groups", Snapchat 101, Online Available at: <https://smartphones.gadgethacks.com/how-to/snapchat-101-audio-video-chat-with-multiple-users-same-time-groups-0184113/>, Apr. 17, 2018, 4 pages.
Mitsuru, Takeuchi, "Face Shape Selection for Automatic Avatar Generation", 13th Annual Conference Proceedings of Virtual Reality Society of Japan tournament Papers [DVD-ROM], The Virtual Reality Society of Japan, Sep. 24, 2008, 7 pages (Official Copy Only) {See communication under Rule 37 CFR § 1.98(a) (3)}.
Non-Final Office Action received for U.S. Appl. No. 16/116,221, dated Nov. 13, 2018, 27 pages.
Non-Final Office Action received for U.S. Appl. No. 16/142,288, dated Nov. 20, 2018, 15 pages.
Non-Final Office Action received for U.S. Appl. No. 16/142,305, dated Nov. 23, 2018, 32 pages.
Non-Final Office Action received for U.S. Appl. No. 16/142,328, dated Nov. 8, 2018, 18 pages.
Non-Final Office Action received for U.S. Appl. No. 16/143,097, dated Feb. 28, 2019, 17 pages.
Non-Final Office Action received for U.S. Appl. No. 16/259,771, dated May 8, 2019, 11 pages.
Non-Final Office Action received for U.S. Appl. No. 16/519,850, dated Mar. 23, 2020, 8 pages.
Notice of Acceptance received for Australian Patent Application No. 2017330212, dated Apr. 28, 2020, 3 pages.
Notice of Allowance received for Japanese Patent Application No. 2018-184254, dated Jun. 15, 2020, 4 pages (1 page of English Translation and 3 pages of Official Copy).
Notice of Allowance received for Japanese Patent Application No. 2019-511767, dated Mar. 30, 2020, 4 pages (1 page of English Translation and 3 pages of Official Copy).
Notice of Allowance received for U.S. Appl. No. 15/713,490, dated Mar. 20, 2019, 15 pages.
Notice of Allowance received for U.S. Appl. No. 16/110,514, dated Apr. 29, 2019, 9 pages.
Notice of Allowance received for U.S. Appl. No. 16/110,514, dated Mar. 13, 2019, 11 pages.
Notice of Allowance received for U.S. Appl. No. 16/116,221, dated Nov. 22, 2019, 13 pages.
Notice of Allowance received for U.S. Appl. No. 16/116,221, dated Sep. 20, 2019, 13 pages.
Notice of Allowance received for U.S. Appl. No. 16/142,288, dated Jun. 24, 2019, 10 pages.
Notice of Allowance received for U.S. Appl. No. 16/142,288, dated Mar. 27, 2019, 9 pages.
Notice of Allowance received for U.S. Appl. No. 16/142,288, dated May 1, 2019, 4 pages.
Notice of Allowance received for U.S. Appl. No. 16/142,305, dated Apr. 3, 2019, 5 pages.
Notice of Allowance received for U.S. Appl. No. 16/142,305, dated May 1, 2019, 2 pages.
Notice of Allowance received for U.S. Appl. No. 16/142,328, dated Apr. 5, 2019, 7 pages.
Notice of Allowance received for U.S. Appl. No. 16/143,097, dated Aug. 29, 2019, 23 pages.
Notice of Allowance received for U.S. Appl. No. 16/143,201, dated Feb. 8, 2019, 9 pages.
Notice of Allowance received for U.S. Appl. No. 16/143,201, dated Nov. 28, 2018, 14 pages.
Notice of Allowance received for U.S. Appl. No. 16/519,850, mailed on Aug. 26, 2020, 8 pages.
Office Action received for Australian Patent Application No. 2017330212, dated Feb. 21, 2020, 2 pages.
Office Action received for Australian Patent Application No. 2019100794, dated Oct. 3, 2019, 4 pages.
Office Action received for Australian Patent Application No. 2020100189, dated Apr. 1, 2020, 3 pages.
Office Action received for Australian Patent Application No. 2020101043, dated Aug. 14, 2020, 5 pages.
Office Action received for Chinese Patent Application No. 201910379481.4, dated Mar. 2, 2020, 18 pages (10 pages of English Translation and 8 pages of Official Copy).
Office Action received for Chinese Patent Application No. 201910691865.X, dated Jul. 8, 2020, 17 pages (8 pages of English Translation and 9 pages of Official Copy).
Office Action received for Chinese Patent Application No. 201910691872.X, dated Jun. 3, 2020, 10 pages (5 pages of English Translation and 5 pages of Official Copy).
Office Action received for Chinese Patent Application No. 201910692978.1, dated Apr. 3, 2020, 19 pages (8 pages of English Translation and 11 pages of Official Copy).
Office Action received for Chinese Patent Application No. 201911199054.4, dated Jul. 3, 2020, 15 pages (9 pages of English Translation and 6 pages of Official Copy).
Office Action received for Chinese Patent Application No. 201911202668.3, dated Aug. 4, 2020, 13 pages (7 pages of English Translation and 6 pages of Official Copy).
Office Action received for Chinese Patent Application No. 201911219525.3, dated Jul. 10, 2020, 7 pages (1 page of English Translation and 6 pages of Official Copy).
Office Action received for Danish Patent Application No. PA201870366, dated Aug. 22, 2019, 3 pages.
Office Action received for Danish Patent Application No. PA201870366, dated Dec. 12, 2018, 3 pages.
Office Action received for Danish Patent Application No. PA201870367, dated Dec. 20, 2018, 5 pages.
Office Action received for Danish Patent Application No. PA201870368, dated Dec. 20, 2018, 5 pages.
Office Action received for Danish Patent Application No. PA201870368, dated Oct. 1, 2019, 6 pages.
Office Action received for Danish Patent Application No. PA201870372, dated Aug. 20, 2019, 2 pages.
Office Action received for Danish Patent Application No. PA201870372, dated Jan. 31, 2019, 4 pages.
Office Action received for Danish Patent Application No. PA201870374, dated Feb. 6, 2019, 5 pages.
Office Action received for Danish Patent Application No. PA201870374, dated Jun. 17, 2019, 5 pages.
Office Action received for Danish Patent Application No. PA201870375, dated Jan. 31, 2019, 4 pages.
Office Action received for Danish Patent Application No. PA201870377, dated Jan. 31, 2019, 4 pages.
Office Action received for European Patent Application No. 19172407.9, dated Oct. 18, 2019, 7 pages.

(56) References Cited

OTHER PUBLICATIONS

Office Action received for European Patent Application No. 19181242.9, dated Dec. 6, 2019, 9 pages.
Office Action received for European Patent Application No. 19724959.2, dated Apr. 23, 2020, 10 pages.
Office Action received for European Patent Application No. 20168021.2, dated Jul. 22, 2020, 8 pages.
Office Action received for Japanese Patent Application No. 2018-182607, dated Apr. 6, 2020, 6 pages (3 pages of English Translation and 3 pages of Official Copy).
Office Action received for Japanese Patent Application No. 2018-182607, dated Jul. 20, 2020, 5 pages (2 pages of English Translation and 3 pages of Official Copy).
Office Action received for Japanese Patent Application No. 2018-184254, dated Mar. 2, 2020, 8 pages (4 pages of English Translation and 4 pages of Official Copy).
Office Action received for Japanese Patent Application No. 2019-215503, dated Jul. 3, 2020, 12 pages (6 pages of English Translation and 6 pages of Official Copy).
Office Action received for Korean Patent Application No. 10-2019-7005369, dated Mar. 13, 2020, 12 pages (5 pages of English Translation and 7 pages of Official Copy).
PC World, "How to make AR Emojis on the Samsung Galaxy S9", You Tube, Available Online: https://www.youtube.com/watch?v=8wQICfulkz0, Feb. 25, 2018, 2 pages.
Result of Consultation received for European Patent Application No. 19724959.2, mailed on Sep. 4, 2020, 3 pages.
Search Report and Opinion received for Danish Patent Application No. PA201870366, dated Aug. 27, 2018, 9 pages.
Search Report and Opinion received for Danish Patent Application No. PA201870367, dated Aug. 27, 2018, 9 pages.
Search Report and Opinion received for Danish Patent Application No. PA201870368, dated Sep. 6, 2018, 7 pages.
Search Report and Opinion received for Danish Patent Application No. PA201870372, dated Sep. 14, 2018, 8 pages.
Search Report and Opinion received for Danish Patent Application No. PA201870372, dated Sep. 17, 2018, 10 pages.
Search Report and Opinion received for Danish Patent Application No. PA201870374, dated Aug. 27, 2018, 9 pages.
Search Report and Opinion received for Danish Patent Application No. PA201870375, dated Aug. 23, 2018, 8 pages.
Search Report and Opinion received for Danish Patent Application No. PA201870377, dated Sep. 4, 2018, 8 pages.
Slashgear, "Samsung AR Emoji demo on the Galaxy S9", Available Online at <https://www.youtube.com/watch?v=GQwNKzY4C9Y>, Feb. 25, 2018, 3 pages.
Spellburst, "The Sims 3: Create a Sim With Me | #2—Dark Fairy + Full CC List!", Available online at: <https://www.youtube.com/watch?v=Dy_5g9B-wkA>, Oct. 9, 2017, 2 pages.
Summons to Attend Oral Proceedings received for European Patent Application No. 19172407.9, mailed on Jun. 24, 2020, 14 pages.
Summons to Attend Oral Proceedings received for European Patent Application No. 19181242.9, mailed on Jun. 16, 2020, 12 pages.
Supplemental Notice of Allowance received for U.S. Appl. No. 15/713,490, dated May 30, 2019, 2 pages.
Supplemental Notice of Allowance received for U.S. Appl. No. 16/143,201, dated Dec. 13, 2018, 2 pages.
Supplemental Notice of Allowance received for U.S. Appl. No. 16/143,201, dated Dec. 19, 2018, 2 pages.
Supplemental Notice of Allowance received for U.S. Appl. No. 16/143,201, dated Jan. 10, 2019, 2 pages.
Tech With Brett, "How to Create Your AR Emoji on the Galaxy S9 and S9+", Available online at: <https://www.youtube.com/watch?v=HHMdcBpC8MQ>, Mar. 16, 2018, 5 pages.
Tsuchihashi, et al., "Generation of Caricatures by Automatic Selection of Templates for Shapes and Placement of Facial Parts", Technical Report of the Institute of Image Information and Television Engineers, Japan, The Institute of Image Information and Television Engineers, vol. 33, No. 11, Feb. 8, 2009, 7 pages (Official Copy Only) {See communication under Rule 37 CFR § 1.98(a)(3)}.
Applicant-Initiated Interview Summary received for U.S. Appl. No. 16/663,062, dated Dec. 18, 2020, 3 pages.
Minutes of the Oral Proceedings received for European Patent Application No. 19181242.9, mailed on Dec. 15, 2020, 6 pages.
Office Action received for Japanese Patent Application No. 2020-120086, dated Nov. 20, 2020, 6 pages (3 pages of English Translation and 3 pages of Official Copy).
Singh, Lovepreet, "Samsung Galaxy Watch: How to Change Watch Face—Tips and Tricks", Online available at: <https://www.youtube.com/watch?pp=desktop&v=IN7gPxTZ1qU>, Dec. 4, 2018, 1 page.
Vidstube, "Bitmoji Clockface on Fitbit Versa Sense/Versa 3/Versa 2", Available online at: <https://www.youtube.com/watch?v=4V_xDnSLeHE>, Jun. 30, 2019, 1 page.
Woolsey, Amanda, "How to Customize The Clock on the Apple Watch", Available online at: <https://www.youtube.com/watch?v=t-3Bckdd9B4>, Apr. 25, 2015, 1 page.
Advisory Action received for U.S. Appl. No. 13/082,035, dated Jun. 19, 2015, 5 pages.
Advisory Action received for U.S. Appl. No. 13/082,035, dated Oct. 23, 2013, 3 pages.
Amin, et al., "The Sense MS: Enriching the SMS experience for Teens by Non-verbal Means", Human-Computer Interaction—INTERACT 2005, IFIP TC13 International Conference Proceedings, Rome, Italy, Sep. 12-16, 2005, pp. 962-965.
Applicant-Initiated Interview Summary received for U.S. Appl. No. 13/082,035, dated Apr. 4, 2013, 3 pages.
Applicant-Initiated Interview Summary received for U.S. Appl. No. 13/082,035, dated Aug. 1, 2016, 3 pages.
Applicant-Initiated Interview Summary received for U.S. Appl. No. 13/082,035, dated Jan. 29, 2015, 3 pages.
Applicant-Initiated Interview Summary received for U.S. Appl. No. 13/082,035, dated Oct. 30, 2013, 3 pages.
Applicant-Initiated Interview Summary received for U.S. Appl. No. 14/866,560, dated Jan. 30, 2019, 3 pages.
Applicant-Initiated Interview Summary received for U.S. Appl. No. 14/866,560, dated Jul. 26, 2018, 3 pages.
Applicant-Initiated Interview Summary received for U.S. Appl. No. 14/866,560, dated May 14, 2019, 4 pages.
Applicant-Initiated Interview Summary received for U.S. Appl. No. 14/866,560, dated Oct. 21, 2019, 3 pages.
Carretero et al., "Preserving Avatar Genuineness in Different Display Media", Mobile Networks and Applications, Kluwer Academic Publishers, vol. 13, No. 6, Jul. 15, 2008, pp. 627-634.
Chittur, Adhitya, "Model Generation for an Intrusion Detection System Using Genetic Algorithms", Nov. 27, 2001, 63 pages.
Final Office Action received for U.S. Appl. No. 13/082,035, dated Apr. 16, 2015, 24 pages.
Final Office Action received for U.S. Appl. No. 13/082,035, dated Aug. 15, 2013, 24 pages.
Final Office Action received for U.S. Appl. No. 14/866,560, dated Oct. 9, 2018, 22 pages.
Free Photoshop Tutorials, Gradient filter II. in Photoshop, Available online at: http://www.digiretus.com/tippek/cikkiro.php?SORSZAM=177, Mar. 25, 2009, 5 pages.
International Preliminary Report on Patentability received for PCT Patent Application No. PCT/US2011/031616, dated Oct. 18, 2012, 6 pages.
International Search Report and Written Opinion received for PCT Patent Application No. PCT/US2011/031616, dated Aug. 30, 2011, 8 pages.
Lee, et al., "A Multi-Touch Three-Dimensional Touch-Sensitive Tablet", CHI '85 Proceedings of the CHI: ACM Conference on Human Factors in Computing Systems, Apr. 1985, pp. 21-25.
Non-Final Office Action received for U.S. Appl. No. 12/791,643, dated Jan. 20, 2012, 11 pages.
Non-Final Office Action received for U.S. Appl. No. 13/082,035, dated Apr. 21, 2016, 25 pages.
Non-Final Office Action received for U.S. Appl. No. 13/082,035, dated Dec. 19, 2012, 19 pages.
Non-Final Office Action received for U.S. Appl. No. 13/082,035, dated Sep. 11, 2014, 23 pages.
Non-Final Office Action received for U.S. Appl. No. 14/866,560, dated Apr. 19, 2018, 10 pages.

(56) References Cited

OTHER PUBLICATIONS

Non-Final Office Action received for U.S. Appl. No. 14/866,560, dated Apr. 30, 2019, 23 pages.
Notice of Allowance received for U.S. Appl. No. 13/082,035, dated Oct. 5, 2016, 9 pages.
Notice of Allowance received for U.S. Appl. No. 14/866,560, dated Nov. 15, 2019, 9 pages.
Office Action received for Taiwanese Patent Application No. 100111887, dated Oct. 7, 2013, 23 pages.
Rubine, Dean Harris., "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Rubine, Dean, "Combining Gestures and Direct Manipulation", CHI '92, May 3-7, 1992, pp. 659-660.
The Mii Avatar Editor, Available Online at http://www.miisearch.com/mii-creator.html, Jan. 7, 2010, 2 pages.
Westerman, Wayne, "Hand Tracking, Finger Identification and Chordic Manipulation on A Multi-Touch Surface", A Dissertation Submitted to the Faculty of the University of Delaware in Partial Fulfillment of the Requirements for the Degree of Doctor of Philosophy in Electrical Engineering, 1999, 363 pages.
Certificate of Examination received for Australian Patent Application No. 2020101043, dated Dec. 22, 2020, 2 pages.
Notice of Acceptance received for Australian Patent Application No. 2019265357, dated Dec. 24, 2020, 3 pages.
Brief Communication Regarding Oral Proceedings received for European Patent Application No. 19172407.9, mailed on Nov. 9, 2020, 1 page.
Corrected Notice of Allowance received for U.S. Appl. No. 16/519,850, dated Nov. 2, 2020, 5 pages.
Notice of Allowance received for Chinese Patent Application No. 201910379481.4, dated Nov. 9, 2020, 6 pages (3 pages of English Translation and 3 pages of Official Copy).
Result of Consultation received for European Patent Application No. 19172407.9, mailed on Nov. 5, 2020, 17 pages.
Result of Consultation received for European Patent Application No. 19204230.7, mailed on Nov. 16, 2020, 3 pages.
Notice of Acceptance received for Australian Patent Application No. 2019266049, dated Nov. 24, 2020, 3 pages.
Office Action received for Chinese Patent Application No. 201910692978.1, dated Nov. 4, 2020, 4 pages (1 page of English Translation and 3 pages of Official Copy).
Office Action received for Chinese Patent Application No. 202010330318.1, dated Nov. 19, 2020, 18 pages (9 pages of English Translation and 9 pages of Official Copy).
Office Action received for Korean Patent Application No. 10-2020-7031855, dated Nov. 24, 2020, 6 pages (2 pages of English Translation and 4 pages of Official Copy).
Intention to Grant received for European Patent Application No. 19172407.9, dated Feb. 11, 2021, 9 pages.
Notice of Allowance received for Chinese Patent Application No. 201910692978.1, dated Feb. 4, 2021, 6 pages (3 pages of English Translation and 3 pages of Official Copy).
Notice of Allowance received for Chinese Patent Application No. 201911202668.3, dated Feb. 4, 2021, 5 pages (2 pages of English Translation and 3 pages of Official Copy).
Brief Communication Regarding Oral Proceedings received for European Patent Application No. 19172407.9, mailed on Nov. 20, 2020, 2 pages.
International Preliminary Report on Patentability received for PCT Patent Application No. PCT/US2019/023793, dated Nov. 19, 2020, 12 pages.
International Preliminary Report on Patentability received for PCT Patent Application No. PCT/US2019/024067, dated Nov. 19, 2020, 12 pages.
Office Action received for Australian Patent Application No. 2020101043, dated Oct. 30, 2020, 4 pages.
Result of Consultation received for European Patent Application No. 19181242.9, mailed on Dec. 1, 2020, 12 pages.
Applivgames, ""Super Mario Run" Stickers for iMessage: Free Delivery Started!", Available online at: <https://games.app-liv.jp/archives/178627>, Sep. 13, 2016, 3 pages (Official Copy Only) (See Communication under 37 CFR § 1.98(a) (3)).
Contents Pocket, "Line Stamp Information", Available online at: <https://web.archive.org/web/20150404080541/http://contents-pocket.net/linestamp.html>, Apr. 2015, 2 pages (Official Copy Only) (See Communication under 37 CFR § 1.98(a) (3)).
Office Action received for Chinese Patent Application No. 201910691865.X, dated Feb. 4, 2021, 16 pages (9 pages of English Translation and 7 pages of Official Copy).
Office Action received for Indian Patent Application No. 201814036470, dated Feb. 26, 2021, 7 pages.
Office Action received for Japanese Patent Application No. 2019-215503, dated Feb. 5, 2021, 12 pages (6 pages of English Translation and 6 pages of Official Copy).
Office Action received for Korean Patent Application No. 10-2020-7032147, dated Feb. 16, 2021, 6 pages (2 pages of English Translation and 4 pages of Official Copy).
Certificate of Examination received for Australian Patent Application No. 2020101715, dated Oct. 6, 2020, 2 pages.
Notice of Acceptance received for Australian Patent Application No. 2020213402, dated Sep. 21, 2020, 3 pages.
Notice of Allowance received for Chinese Patent Application No. 201911219525.3, dated Sep. 29, 2020, 2 pages (1 page of English Translation and 1 page of Official Copy).
Office Action received for European Patent Application No. 19204230.7, dated Sep. 28, 2020, 6 pages.
Result of Consultation received for European Patent Application No. 19204230.7, mailed on Sep. 24, 2020, 5 pages.
Non-Final Office Action received for U.S. Appl. No. 16/599,433, dated Jan. 28, 2021, 16 pages.
Office Action received for Chinese Patent Application No. 201911199054.4, dated Jan. 20, 2021, 19 pages (11 pages of English Translation and 8 pages of Official Copy).
Pre-Appeal Review Report received for Japanese Patent Application No. 2018-182607, mailed on Jan. 21, 2021, 4 pages (2 pages of English Translation and 2 pages of Official Copy).
Summons to Attend Oral Proceedings received for European Patent Application No. 19724959.2, mailed on Feb. 1, 2021, 9 pages.
Neurotechnology, "Sentimask SDK", Available at: https://www.neurotechnology.com/sentimask.html, Apr. 22, 2018, 5 pages.
ZY News, "Generate Cartoon Face within Three Seconds, You are the New-generation Expression Emperor", Online available at: <http://inews.ifeng.com/48551936/news.shtml>, Apr. 22, 2016, 3 pages (Official Copy Only) See communication under 37 CFR § 1.98(a) (3).
Ali et al., "Facial Expression Recognition Using Human to Animated-Character Expression Translation", Oct. 12, 2019, 8 pages.
Examiner's Answer to Appeal Brief received for U.S. Appl. No. 16/259,771, mailed on Oct. 23, 2020, 15 pages.
Gao et al., "Automatic Unpaired Shape Deformation Transfer", ACM Transactions on Graphics, Online available at: https://doi.org/10.1145/3272127.3275028, 2018, 11 pages.
Noh et al., "Expression Cloning", Proceedings of the 28th annual conference on Computer Graphics and Interactive Techniques, ACM SIGGRAPH, Los Angeles, CA, USA, Aug. 12-17, 2001, 12 pages.
Non-Final Office Action received for U.S. Appl. No. 16/663,062, dated Oct. 28, 2020, 14 pages.
Notice of Allowance received for Korean Patent Application No. 10-2019-7005369, dated Oct. 26, 2020, 4 pages (1 page of English Translation and 3 pages of Official Copy).
Pumarola et al., "GANimation: Anatomically-aware Facial Animation from a Single Image", Proceedings of the European Conference on Computer Vision (ECCV), Jul. 24, 2018, 16 pages.
Pyun et al., "An Example-Based Approach for Facial Expression Cloning", SIGGRAPH Symposium on Computer Animation, The Eurographics Association (2003), 2003, 10 pages.
Zhang et al., "Facial Expression Retargeting from Human to Avatar Made Easy", IEEE Transactions On Visualization And Computer Graphics, Aug. 2020, 14 pages.

(56) References Cited

OTHER PUBLICATIONS

Zhao et al., "An Event-related Potential Comparison of Facial Expression Processing between Cartoon and Real Faces", Online available at: https://www.biorxiv.org/content/10.1101/333898v2, Jun. 18, 2018, 31 pages.
Corrected Notice of Allowance received for U.S. Appl. No. 16/663,062, dated Jul. 21, 2021, 2 pages.
Notice of Allowance received for Korean Patent Application No. 10-2021-7019525, dated Jul. 13, 2021, 5 pages (1 page of English Translation and 4 pages of Official Copy).
Office Action received for Australian Patent Application No. 2020239749, dated Jul. 16, 2021, 5 pages.
Office Action received for Indian Patent Application No. 201814036472, dated Jul. 8, 2021, 8 pages.
Applicant-Initiated Interview Summary received for U.S. Appl. No. 17/031,654, dated Feb. 1, 2021, 2 pages.
Non-Final Office Action received for U.S. Appl. No. 17/031,654, dated Nov. 19, 2020, 12 pages.
Non-Final Office Action received far U.S. Appl. No. 17/031,671, dated Apr. 30, 2021, 27 pages.
Non-Final Office Action received for U.S. Patent Application No. 17/031,765, dated Jun. 28, 2021, 32 pages.
Notice of Allowance received for U.S. Appl. No. 16/663,062, dated July 13, 2021, 7 pages.
Notice of Allowance received for U.S. Appl. No. 17/031,654, dated Feb. 10, 2021, 9 pages.
Notice of Allowance received for U.S. Patent Application No. 17/031,654, dated May 27, 2021, 8 pages.
Office Action received for Chinese Patent Application No. 201911199054.4, dated Jun. 10, 2021, 13 pages (7 pages of English Translation and 6 pages of Official Copy).
Office Action received for Danish Patent Application No. PA202070624, dated Jun. 16, 2021, 5 pages.
Office Action received for Danish Patent Application No. PA202070625, dated Jun. 16, 2021, 3 pages.
Search Report and Opinion received for Danish Patent Application No. PA202070623, dated Dec. 21, 2020, 9 pages.
Search Report and Opinion received for Danish Patent Application No. PA202070624, dated Dec. 10, 2029, 10 pages.
Search Report and Opinion received for Danish Patent Application No. PA202070625, dated Dec. 17, 2020, 9 pages.
Applicant-Initiated Interview Summary received for U.S. Appl. No. 16/599,433, dated Apr. 20, 2021, 7 pages.
Intention to Grant received for European Patent Application No. 20168021.2, dated Apr. 15, 2021, 8 pages.
Office Action received for Chinese Patent Application No. 201910691872.X, dated Mar. 24, 2021, 19 pages (9 pages of English Translation and 10 pages of Official Copy).
Office Action received for Japanese Patent Application No. 2020-193703, dated Apr. 19, 2021, 4 pages (2 pages of English Translation and 2 pages of Official Copy).
Office Action received for Korean Patent Application No. 10-2021-7002582, dated Apr. 16, 2021, 13 pages (6 pages of English Translation and 7 pages of Official Copy).
Notice of Allowance received for Korean Patent Application No. 10-2020-7032147, dated May 12, 2021, 4 pages (1 page of English Translation and 3 pages of Official Copy).
Notice of Allowance received for U.S. Appl. No. 16/599,433, dated May 14, 2021, 11 pages.
Summons to Attend Oral Proceedings received for European Patent Application No. 19204230.7, mailed on May 25, 2021, 10 pages.
Corrected Notice of Allowance received for U.S. Appl. No. 16/663,062, dated Apr. 14, 2021, 2 pages.
Notice of Allowance received for Korean Patent Application No. 10-2020-7031855, dated Mar. 22, 2021, 5 pages (1 page of English Translation and 4 pages of Official Copy).
Office Action received for European Patent Application No. 17853657.9, dated Apr. 1, 2021, 6 pages.
Summons to Attend Oral Proceedings received for European Patent Application No. 19724959.2, mailed on Mar. 31, 2021, 3 pages.
Notice of Allowance received for U.S. Appl. No. 16/663,062, dated Mar. 24, 2021, 8 pages.
Office Action received for European Patent Application No. 19212057.4, dated Mar. 9, 2021, 6 pages.
Corrected Notice of Allowance received for U.S. Appl. No. 16/599,433, dated Aug. 13, 2021, 5 pages.
Decision on Appeal received for U.S. Appl. No. 16/259,771, dated Aug. 19, 2021, 12 pages.
Decision to Grant received for Japanese Patent Application No. 2020-193703, dated Aug. 10, 2021, 3 pages (1 page of English Translation and 2 pages of Official Copy).
Office Action received for Chinese Patent Application No. 202010330318.1, dated Jul. 13, 2021, 12 pages (6 pages of English Translation and 6 pages of Official Copy).
Decision to Grant received for European Patent Application No. 19172407.9, dated Jun. 17, 2021, 2 pages.
Decision to Refuse received for European Patent Application No. 19724959.2, dated Jun. 22, 2021, 13 pages.
Minutes of the Oral Proceedings received for European Patent Application No. 19724959.2, mailed on Jun. 14, 2021, 6 pages.
Office Action received for Japanese Patent Application No. 2020-120086, dated May 21, 2021, 6 pages (3 pages of English Translation and 3 pages of Official Copy).
Rosa et al., "Stripe Generator—a Free Tool for the Web Design Community", Available online at: http://www.stripegenerator.com/, Mar. 28, 2019, 2 pages.
Office Action received for Chinese Patent Application No. 202010330318.1, dated Mar. 31, 2021, 13 pages (7 pages of English Translation and 6 pages of Official Copy).
Final Office Action received for U.S. Appl. No. 17/031,671, dated Sep. 7, 2021, 27 pages.
Office Action received for Danish Patent Application No. PA202070623, dated Aug. 24, 2021, 3 pages.
Applicant Initiated Interview Summary received for U.S. Appl. No. 17/031,671, dated Aug. 2, 2021, 5 pages.
International Preliminary Report on Patentability received for PCT Patent Application No. PCT/US2020/014176, dated Jul. 29, 2021, 9 pages.
Invitation to Pay Additional Fees received for PCT Patent Application No. PCT/US2021/031212, dated Jul. 28, 2021, 19 pages.
Office Action received for Chinese Patent Application No. 201910691872.X, dated Jun. 23, 2021, 10 pages (5 pages of English Translation and 5 pages of Official Copy).
Record of Oral Hearing received for U.S. Appl. No. 16/259,771, mailed on Aug. 4, 2021, 15 pages.
Applicant Initiated Interview Summary received for U.S. Appl. No. 17/031,671, dated Jun. 13, 2022, 7 pages.
Applicant Initiated Interview Summary received for U.S. Appl. No. 16/259,771, dated Nov. 8, 2021, 5 pages.
Applicant-Initiated Interview Summary received for U.S. Appl. No. 16/259,771, dated Apr. 18, 2022, 2 pages.
Applicant-Initiated Interview Summary received for U.S. Appl. No. 17/031,765, dated Dec. 15, 2021, 4 pages.
Applicant-Initiated Interview Summary received for U.S. Appl. No. 17/031,765, dated May 23, 2022, 5 pages.
Applicant-initiated Interview Summary received for U.S. Appl. No. 17/093,408, dated Sep. 22, 2021, 5 pages.
Applicant-Initiated Interview Summary received for U.S. Appl. No. 17/093,408, dated Jul. 1, 2022, 3 pages.
Applicant-Initiated Interview Summary received for U.S. Appl. No. 17/373,163, dated Mar. 1, 2022, 3 pages.
Applicant-Initiated Interview Summary received for U.S. Appl. No. 17/373,163, dated Apr. 11, 2022, 2 pages.
Corrected Notice of Allowance received for U.S. Appl. No. 17/091,460, dated Oct. 14, 2021, 3 pages.
Corrected Notice of Allowance received for U.S. Appl. No. 17/091,460, dated Feb. 16, 2022, 6 pages.
Corrected Notice of Allowance received for U.S. Appl. No. 17/091,460, dated Feb. 25, 2022, 6 pages.
Corrected Notice of Allowance received for U.S. Appl. No. 17/373,163, dated Jul. 15, 2022, 5 pages.
Corrected Notice of Allowance received for U.S. Appl. No. 17/373,163, dated Jun. 27, 2022, 5 pages.

(56) References Cited

OTHER PUBLICATIONS

Decision on Appeal received for Korean Patent Application No. 10-2021-7002582, dated May 13, 2022, 29 pages (2 pages of English Translation and 27 pages of Official Copy).
Decision to Grant received for European Patent Application No. 20168021.2, dated Feb. 3, 2022, 2 pages.
Decision to Grant received for Japanese Patent Application No. 2018-182607, dated Apr. 13, 2022, 3 pages (1 page of English Translation and 2 pages of Official Copy).
Decision to Refuse received for European Patent Application No. 19204230.7, dated Feb. 4, 2022, 15 pages.
Examiner's Pre-Review Report received for Japanese Patent Application No. 2019-215503, dated Aug. 20, 2021, 15 pages (8 pages of English Translation and 7 pages of Official Copy).
Extended European Search Report received for European Patent Application No. 22154034.7, dated May 11, 2022, 14 pages.
Final Office Action received for U.S. Appl. No. 17/031,765, dated Oct. 29, 2021, 34 pages.
Final Office Action received for U.S. Appl. No. 17/093,408, dated May 18, 2022, 41 pages.
Intention to Grant received for Danish Patent Application No. PA202070623, dated Jul. 20, 2022, 2 pages.
Intention to Grant received for European Patent Application No. 19181242.9, dated Oct. 28, 2021, 16 pages.
Intention to Grant received for European Patent Application No. 20168021.2, dated Sep. 20, 2021, 8 pages.
International Search Report and Written Opinion received for PCT Patent Application No. PCT/US2021/031096, dated Oct. 13, 2021, 16 pages.
International Search Report and Written Opinion received for PCT Patent Application No. PCT/US2021/031212, dated Sep. 21, 2021, 21 pages.
Invitation to Pay Additional Fees received for PCT Patent Application No. PCT/US2021/031096, dated Aug. 19, 2021, 8 pages.
Minutes of the Oral Proceedings received for European Patent Application No. 19204230.7, dated Feb. 2, 2022, 9 pages.
Non-Final Office Action received for U.S. Appl. No. 16/259,771, dated Jan. 25, 2022, 20 pages.
Non-Final Office Action received for U.S. Appl. No. 17/031,671, dated Apr. 1, 2022, 32 pages.
Non-Final Office Action received for U.S. Appl. No. 17/031,765, dated Mar. 29, 2022, 33 pages.
Non-Final Office Action received for U.S. Appl. No. 17/093,408, dated Sep. 10, 2021, 10 pages.
Non-Final Office Action received for U.S. Appl. No. 17/093,408, dated Dec. 8, 2021, 37 pages.
Non-Final Office Action received for U.S. Appl. No. 17/370,505, dated Jul. 6, 2022, 14 pages.
Non-Final Office Action received for U.S. Appl. No. 17/373,163, dated Jan. 27, 2022, 14 pages.
Notice of Acceptance received for Australian Patent Application No. 2020239749, dated May 27, 2022, 3 pages.
Notice of Acceptance received for Australian Patent Application No. 2020294208, dated Mar. 2, 2022, 3 pages.
Notice of Acceptance received for Australian Patent Application No. 2021201295, dated May 10, 2022, 3 pages.
Notice of Allowance received for Japanese Patent Application No. 2020-120086, dated Nov. 15, 2021, 5 pages (2 pages of English Translation and 3 pages of Official Copy).
Notice of Allowance received for Japanese Patent Application No. 2020-159825, dated Mar. 25, 2022, 5 pages (1 page of English Translation and 4 pages of Official Copy).
Notice of Allowance received for Korean Patent Application No. 10-2021-7023617, dated Dec. 21, 2021, 6 pages (2 pages of English Translation and 4 pages of Official Copy).
Notice of Allowance received for Korean Patent Application No. 10-2022-7002829, dated Feb. 12, 2022, 6 pages (1 page of English Translation and 5 pages of Official Copy).
Notice of Allowance received for Korean Patent Application No. 10-2022-7016421, dated May 25, 2022, 6 pages (2 pages of English Translation and 4 pages of Official Copy).
Notice of Allowance received for U.S. Appl. No. 16/599,433, dated Oct. 4, 2021, 13 pages.
Notice of Allowance received for U.S. Appl. No. 17/091,460, dated Apr. 28, 2022, 9 pages.
Notice of Allowance received for U.S. Appl. No. 17/091,460, dated Feb. 4, 2022, 10 pages.
Notice of Allowance received for U.S. Appl. No. 17/091,460, dated May 23, 2022, 9 pages.
Notice of Allowance received for U.S. Appl. No. 17/373,163, dated Jul. 27, 2022, 8 pages.
Notice of Allowance received for U.S. Appl. No. 17/373,163, dated May 11, 2022, 8 pages.
Office Action received for Australian Patent Application No. 2020239749, dated Jan. 21, 2022, 4 pages.
Office Action received for Australian Patent Application No. 2020294208, dated Dec. 17, 2021, 2 pages.
Office Action received for Australian Patent Application No. 2021201295, dated Jan. 14, 2022, 3 pages.
Office Action received for Australian Patent Application No. 2021202254, dated Jun. 20, 2022, 2 pages.
Office Action received for Chinese Patent Application No. 201910315328.5, dated Nov. 30, 2021, 21 pages (10 pages of English Translation and 11 pages of Official Copy).
Office Action received for Chinese Patent Application No. 201910691865.X, dated Aug. 4, 2021, 10 pages (6 pages of English Translation and 4 pages of Official Copy).
Office Action received for Chinese Patent Application No. 201910691872.X, dated Nov. 10, 2021, 16 pages (9 pages of English Translation and 7 pages of Official Copy).
Office Action received for Chinese Patent Application No. 202110820692.4, dated Mar. 15, 2022, 18 pages (9 pages of English Translation and 9 pages of Official Copy).
Office Action received for Danish Patent Application No. PA202070623, dated May 23, 2022, 3 pages.
Office Action received for Danish Patent Application No. PA202070624, dated Feb. 4, 2022, 4 pages.
Office Action received for Danish Patent Application No. PA202070625, dated Feb. 8, 2022, 2 pages.
Office Action received for Japanese Patent Application No. 2018-182607, dated Sep. 8, 2021, 7 pages (4 pages of English Translation and 3 pages of Official Copy).
Office Action received for Japanese Patent Application No. 2020-159823, dated Dec. 23, 2021, 8 pages (4 pages of English Translation and 4 pages of Official Copy).
Office Action received for Japanese Patent Application No. 2020-159824, dated Dec. 17, 2021, 13 pages (7 pages of English Translation and 6 pages of Official Copy).
Office Action received for Japanese Patent Application No. 2020-159825, dated Dec. 10, 2021, 4 pages (2 pages of English Translation and 2 pages of Official Copy).
Office Action received for Japanese Patent Application No. 2021-092483, dated Apr. 1, 2022, 8 pages (4 pages of English Translation and 4 pages of Official Copy).
Office Action received for Korean Patent Application No. 10-2020-0123852, dated Jun. 9, 2022, 10 pages (4 pages of English Translation and 6 pages of Official Copy).
Office Action received for Korean Patent Application No. 10-2020-0123857, dated Jun. 9, 2022, 12 pages (5 pages of English Translation and 7 pages of Official Copy).
Office Action received for Korean Patent Application No. 10-2020-0123887, dated Jun. 9, 2022, 5 pages (2 pages of English Translation and 3 pages of Official Copy).
Office Action received for Korean Patent Application No. 10-2021-7002582, dated Oct. 29, 2021, 6 pages (3 pages of English Translation and 3 pages of Official Copy).
Office Action received for Korean Patent Application No. 10-2022-7003364, dated Apr. 22, 2022, 14 pages (6 pages of English Translation and 8 pages of Official Copy).
Summons to Attend Oral Proceedings received for European Patent Application No. 19181242.9, dated May 19, 2022, 7 pages.

(56) References Cited

OTHER PUBLICATIONS

Ilovex, "Stripe Generator", a tool that makes it easy to create striped materials, Online available at: https://www.ilovex.co.jp/blog/system/webconsulting/stripe-generator.html, May 2, 2012, 3 pages (Official Copy Only) (See Communication under 37 CFR § 1.98(a) (3)).

Theunlockr, "Galaxy Watch Complete Walkthrough: The Best Watch They've Made So Far", Available online at: https://www.youtube.com/watch?v=xiECIfe1SN4, Sep. 11, 2018, 27 pages.

Ilovex, "Stripe Generator, a tool that makes it easy to create striped materials", Online available at: https://www.ilovex.co.jp/bloo/system/webconsultingistripe-generator.html, May 02, 2012, 3 pages. Cited by Japanese Patent Office in an Office Action for related Patent Application No. 2020-159825 dated Dec. 10, 2021.

\* cited by examiner

AVATAR EDITING ENVIRONMENT

CROSS-REFERENCE TO RELATED APPLICATIONS

This application is a continuation of U.S. application Ser. No. 14/866,560, filed on Sep. 25, 2015, entitled "Avatar Editing Environment," which is a continuation of U.S. application Ser. No. 13/082,035 filed on Apr. 7, 2011, entitled "Avatar Editing Environment," which claims the benefit of U.S. Provisional Application Ser. No. 61/321,840, filed on Apr. 7, 2010, under 35 U.S.C. §119(e), the contents of which are incorporated herein by reference in their entirety.

TECHNICAL FIELD

This disclosure relates generally to avatar creation for computer systems and other devices.

BACKGROUND

An avatar is representation of a user or their alter ego. An avatar is often in the form of a three-dimensional (3D) model used in computer games or a two-dimensional (2D) icon or picture used on Internet forums, social networks and other communities. Avatars can also be used in video games, including online interactive gaming environments.

Avatars in video games are the player's physical representation in the game world. Online games often provide means for creating varied and sophisticated avatars. In some online games, players can construct a customized avatar by selecting from a number of preset facial structures, hairstyles, skin tones, clothes, accessories, etc. (collectively referred to as "elements"). Once the preset elements are selected, there is no facility for allowing users to manually adjust the elements (e.g., resize or position elements).

SUMMARY

An avatar editing environment is disclosed that allows users to create custom avatars for use in online games and other applications. Starting with a blank face the user can add, rescale and position different elements on the blank face, including but not limited to different eyes, ears, mouth (including teeth and smile), nose, eyebrows, hair, beard, moustache, glasses, earrings, hats, and other elements that are associated with physical characteristics of humans and fashion. The user can also change the shape of the avatar's face, the avatar's skin color and the color of all the elements.

In some implementations, touch input and gestures can be used to edit the avatar. Various controls can be used to create the avatar, such as controls for resizing, rotating, positioning, etc. The user can choose between manual and automatic avatar creation. In some implementations, the avatar editing environment can be part of a framework that is available to applications, such as address books, text messaging, chat sessions, e-mail, games or any other applications. In some implementations, one or more elements of the avatar can be animated. For example, the avatar's eyes can be animated to track an object in a user interface or to indicate direction. In some implementations avatar data can be stored on a network so that the avatar can be used in online applications or downloaded to a variety of user devices at different user locations.

In some implementations, a computer implemented method includes: presenting an avatar editing environment on a display of a device; displaying a three-dimensional avatar model in the avatar editing environment; receiving first input selecting an avatar element category; receiving a second input selecting an avatar element from the avatar category; rendering the selected avatar element on the three-dimensional (3D) avatar model; and receiving third input for manually editing the avatar element.

Some embodiments include one or more application programming interfaces (APIs) in an environment with calling program code interacting with other program code being called through the one or more interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, and other types of invocations or parameters via the API.

The details of one or more implementations of an avatar editing environment are set forth in the accompanying drawings and the description below. Other features, aspects, and advantages of the avatar editing environment will become apparent from the description, the drawings, and the claims.

BRIEF DESCRIPTION OF THE DRAWINGS

Like reference symbols in the various drawings indicate like elements.

DETAILED DESCRIPTION

Overview of Avatar Editing Environment

FIGS. 1A-1E illustrate an exemplary avatar editing environment for creating custom avatars. In some implementations, a user of device 100 (e.g., a mobile device) can invoke an avatar editing application by selecting an icon on a homescreen or by selecting the application through a menu or other input mechanism. In some implementations, the avatar editing environment can be presented in a web page displayed in a browser of device 100. The web page can be served my a network service (e.g., a mobile service).

Upon invocation of the avatar editing environment, a user interface 104 for the editing environment can be presented on a display 102 of device 100. Display 102 can be a touch sensitive display or surface responsive to touch input and gestures. Although a mobile device is shown, device 100 can be a desktop computer, a handheld computer, a personal digital assistant, a cellular telephone, an electronic tablet, a network appliance, a camera, a smart phone, an enhanced general packet radio service (EGPRS) mobile phone, a network base station, a media player, a navigation device, an email device, a game console, or a combination of any two or more of these devices.

Figure 1A:
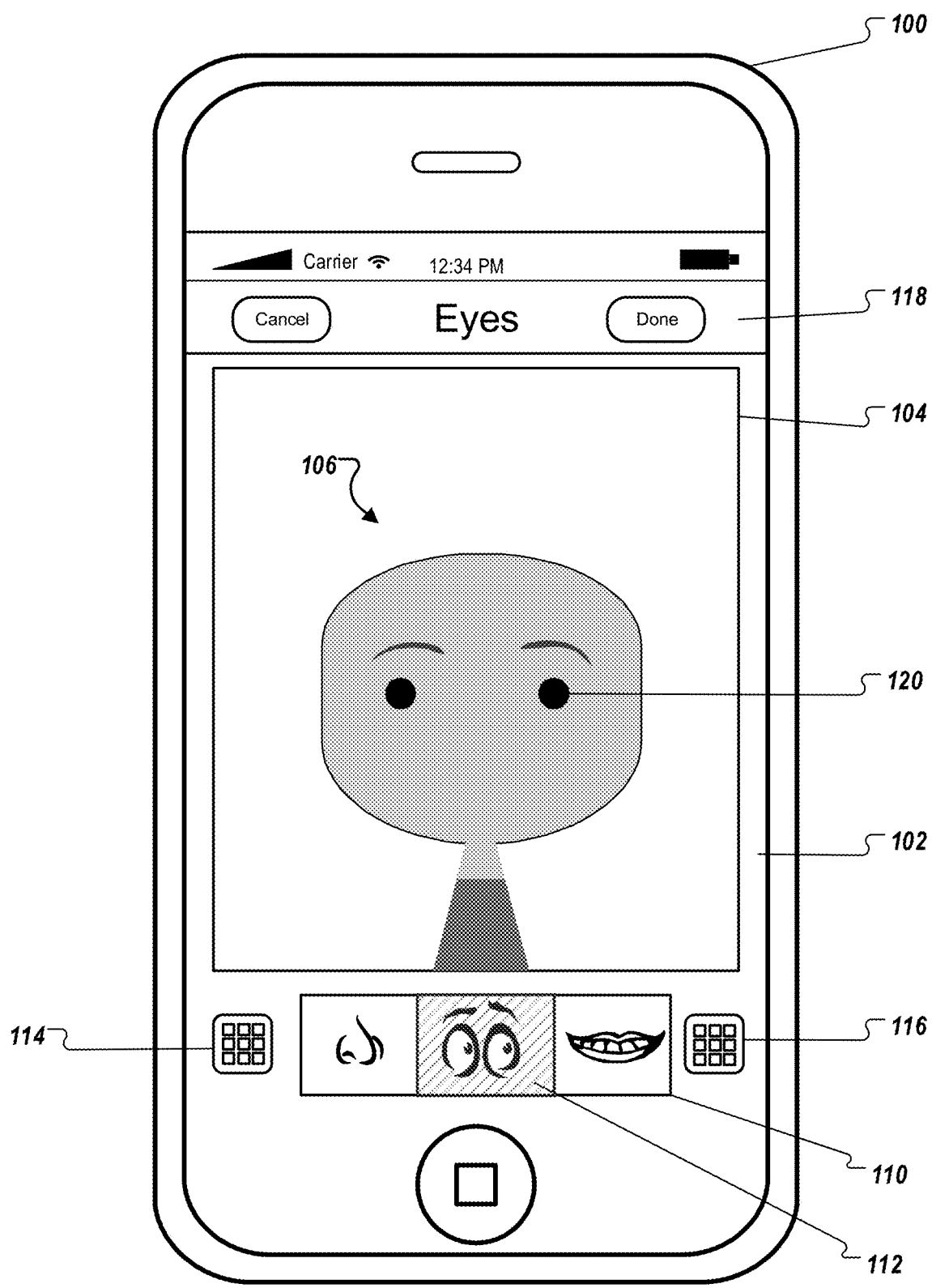
FIGS. 1A-1E illustrate an exemplary avatar editing environment for creating custom avatars.

Referring to FIG. 1A, in some implementations avatar 106 can be displayed on user interface 104. Avatar 106 can be a 2D or 3D avatar model. Avatar 106 can also be full body avatar. When the editing environment is invoked or the user is creating a new avatar, a default avatar can be displayed on user interface 104. In some implementations, the default avatar can have a blank face for receiving elements selected by the user in the editing environment. In other implementations, a default avatar having predefined elements can be displayed. The default avatar can be automatically created based on user preferences specified in a dialog. For example, when the user first invokes a game environment on device 100, the user can be presented with a number of predefined avatars and the user can select one as a default avatar. In other implementations, a default avatar can be automatically created on-the-fly based on user preferences for physical characteristics, such as gender, age, hair color, eye color, etc. Starting with a blank face the user can add different elements on the blank face, including but not limited to different eyes, ears, mouth (including teeth and smile), nose, eyebrows, hair, beard, moustache, glasses, earrings, hats, and other elements that are associated with physical characteristics of humans and fashion. The user can also change the shape of the avatar's face, the avatar's skin color and the color of all the elements.

Exemplary Category Picker

In the example shown, the user selected an "Eyes" category from category picker 110. Category picker 110 can be a bar with icons representing element categories. Text and other visual indicators of categories can also be used. The selected category can be the category having an icon in center position 112 of category picker 110. The icon in center position 112 can be highlighted or otherwise visually enhanced to indicate its selected status. In some implementations, the user can make a swipe gesture on the bar to the left or right to move a different icon into center position 112. In response to the swipe gesture, category picker 110 can be animated so that the category icons move like a wheel on a slot machine. Friction can also be simulated so that acceleration of the wheel can be controlled. For example, a faster gesture results in an increased acceleration of the icons passing through center position 112.

In the example shown, the "Eyes" category is currently occupying middle position 112 and is therefore highlighted to indicate its selected status. An element picker represented by icon 116 was used to select eyes element 120. Upon its selection, the eyes element 120 were added to the face of avatar 106, which was originally blank. The operation of the element picker is further described in reference to FIG. 2A.

Display 102 presents control region 118. Control region 118 can include text describing the currently selected category. For example, the currently selected "Eyes" category is indicated by the text "Eyes" in control region 118. Control region 118 can also include one or more controls (e.g., virtual buttons) for exiting the avatar editing environment. In the example shown, a first virtual button can cancel (e.g., exit) the avatar editing environment without saving changes to avatar 106 (e.g., "Cancel" button). Another button can be used to exit the avatar editing environment and save changes to avatar 106 (e.g., "Done" button).

A color picker represented by icon 114 can be selected to allow the user to select a color for the selected category. For example, if the "Eyes" category is selected, the color picker can be used to select a color for all the eyes elements that can be selected using element picker 116. The operation of the color picker will be further described in reference to FIG. 2B.

Figure 1B:
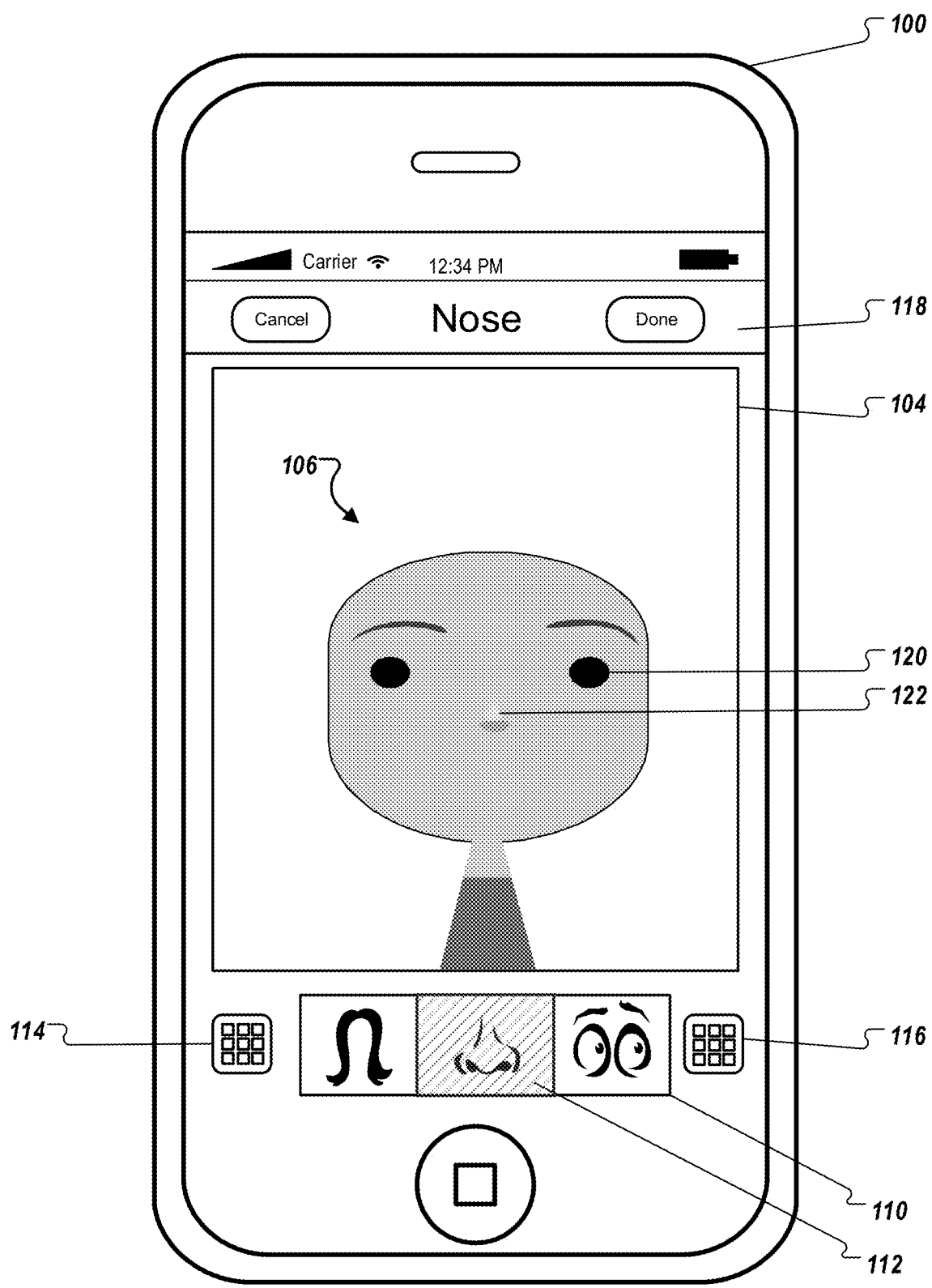

Referring to FIG. 1B, the user has selected a "Nose" category using category picker 110. The selection is indicated by an icon of a nose occupying center position 112 of category picker 110. Control region 118 indicates that the category "Nose" has been selected by displaying the text "Nose." The user selected nose element 122 from the element picker. Nose element 122 was automatically added to the face of avatar 106. The selected element category can be used to determine a default region on the avatar face to add the selected element from the category. In this case, the "Nose" category selection determined the location of nose element 122 to be the center of the avatar face.

Figure 1C:
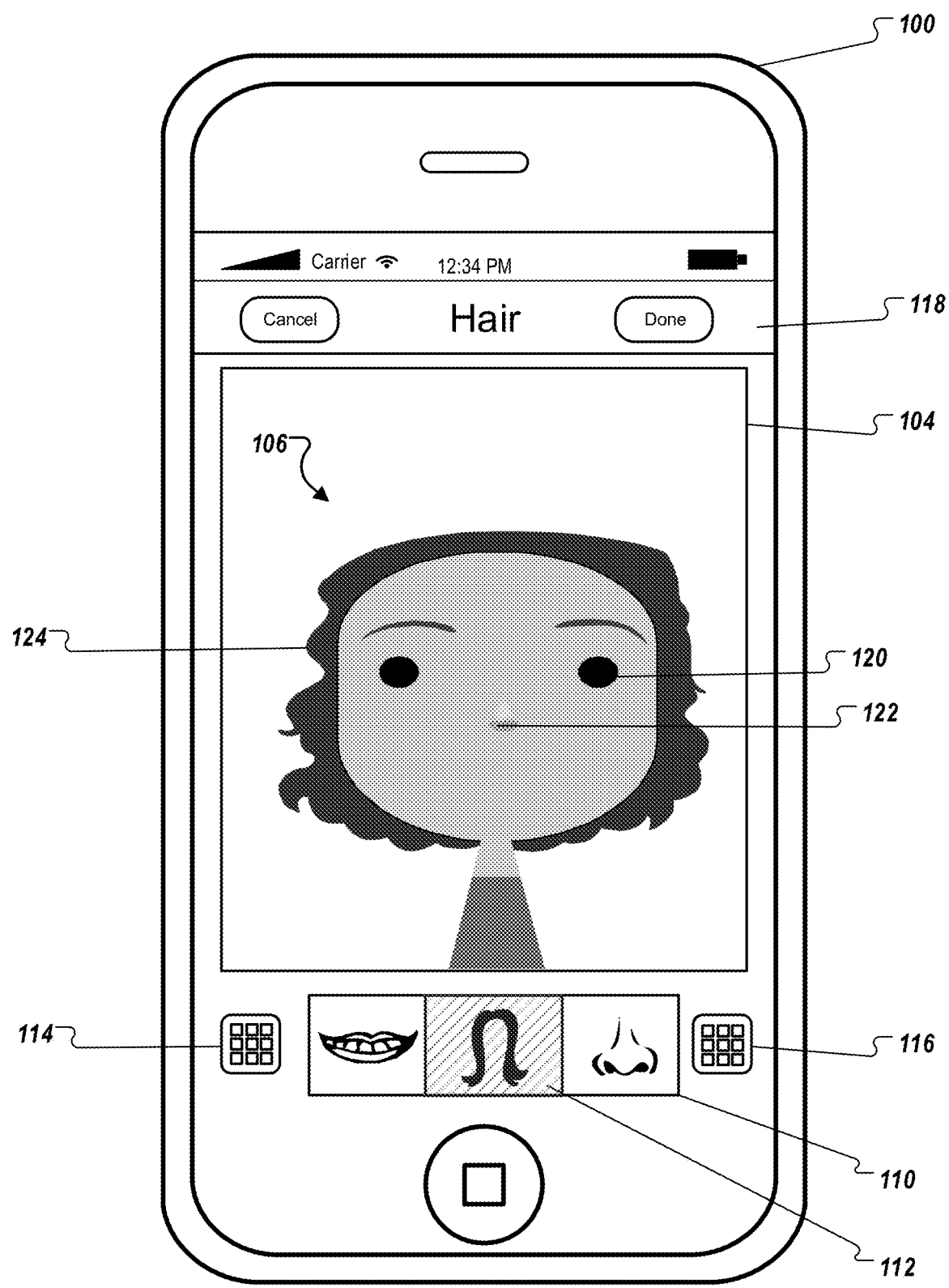

Referring to FIG. 1C, the user has selected a "Hair" category using category picker 110. The selection is indicated by an icon of hair occupying center position 112 of category picker 110. Control region 118 indicates that the element category "Hair" has been selected by displaying the text "Hair." The user selected hair element 124 from the element picker. Hair element 124 was automatically added to the avatar face. The "Hair" category selection determined the location of hair element 124 to be on top of the avatar head.

Figure 1D:
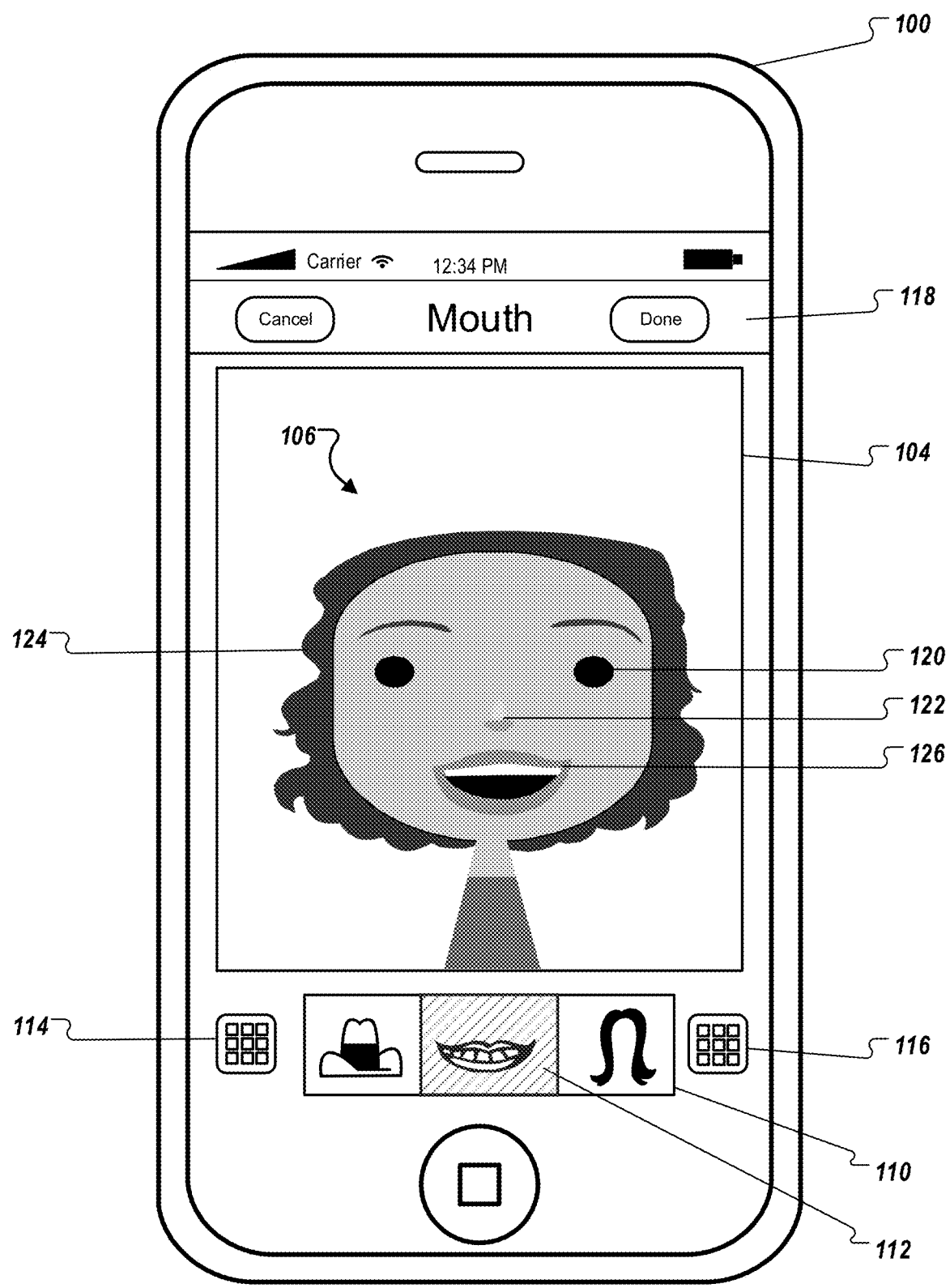

Referring to FIG. 1D, the user has selected a "Mouth" category using category picker 110. The selection is indicated by an image of a mouth occupying center position 112 of category picker 110. Control region 118 indicates that the element category "Mouth" has been selected by displaying the text "Mouth." The user selected mouth element 126 from the element picker. Mouth element 126 was automatically added to the avatar face. The "Mouth" category selection determined the location of mouth element 126 to be below nose element 122 on the avatar face.

Figure 1E:
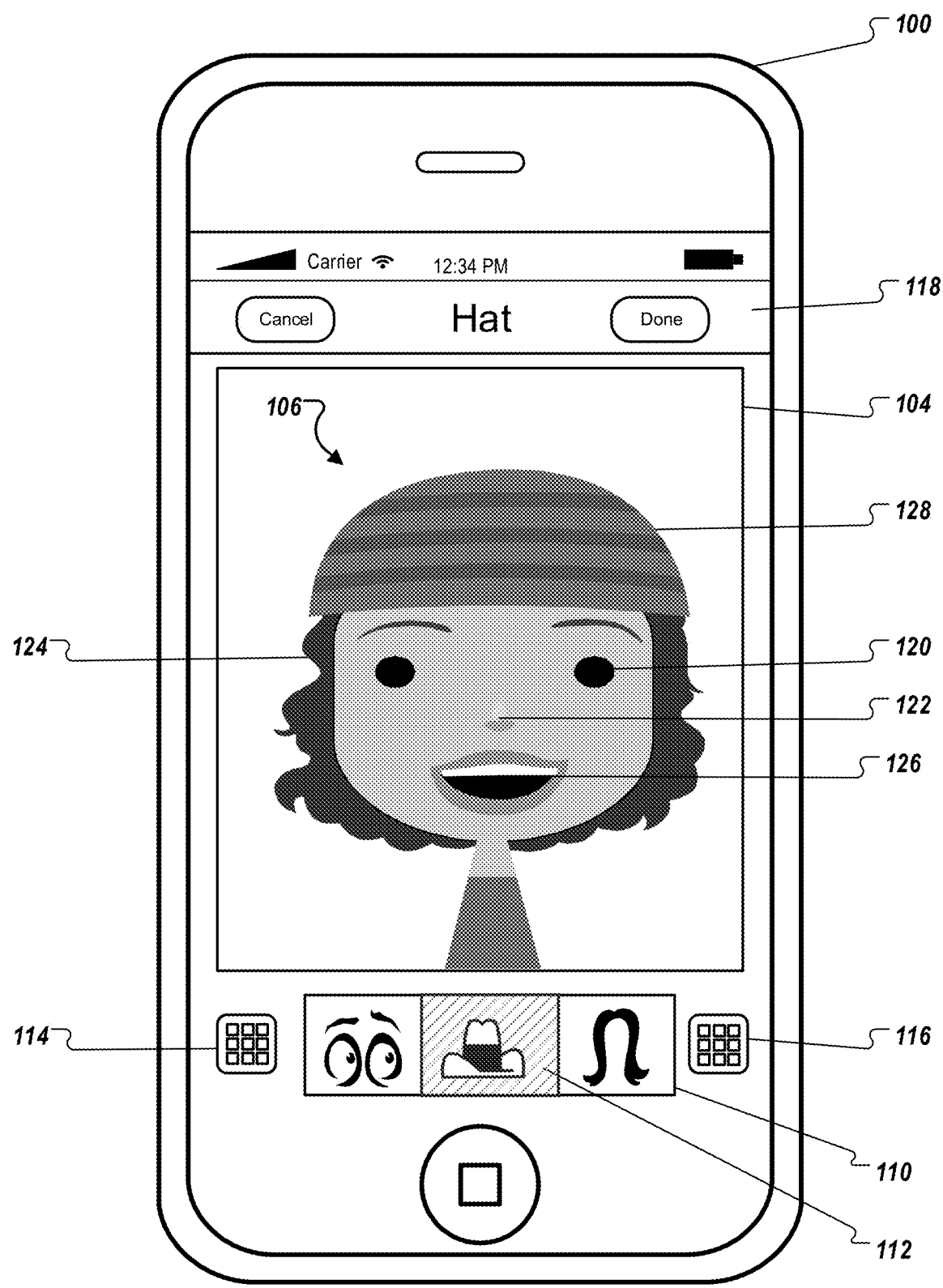

Referring to FIG. 1E, the user has selected a "Hat" category using category picker 110. The selection is indicated by an image of a hat occupying center position 112 of category picker 110. Control region 118 indicates that the category "Hat" has been selected by displaying the text "Hat." The user selected a hat element 128 from the element picker. Hat element 128 was automatically added to the avatar head. The "Hat" category selection determined the location of hat element 128 to be on top of hair element 124.

In FIGS. 1A-1E, the user selected eyes, nose, hair, mouth and a hat for avatar 106. In some implementations, the elements can be 2D textures, which are rendered onto a 3D model of the avatar head. In some implementations, the elements can be 3D objects that are rendered onto the 3D model of the avatar head. For example, a graphics engine can create "eye sockets" in the 3D model and insert 3D "eye" objects into the sockets. The 3D "eye" objects can be animated to create the illusion that the avatar is looking in a particular direction or tracking objects, as described in reference to FIGS. 6A-6B.

In some implementations, when adding both hair and hat elements to an avatar, the hair element can be modified so that when the hat element is added to the avatar the hair appears to be covered while still maintaining the selected hair style. For example, "spikey" hair with a baseball cap could result in hair sticking out through the top of the cap. To avoid this issue, the hair element is cut into two parts. The editing environment can determine if a hat and hair combination would result in hair sticking out through the top of the hat, and in those cases, only the bottom half of the hair is rendered on the avatar model.

Exemplary Avatar Element Picker

Figure 2A:
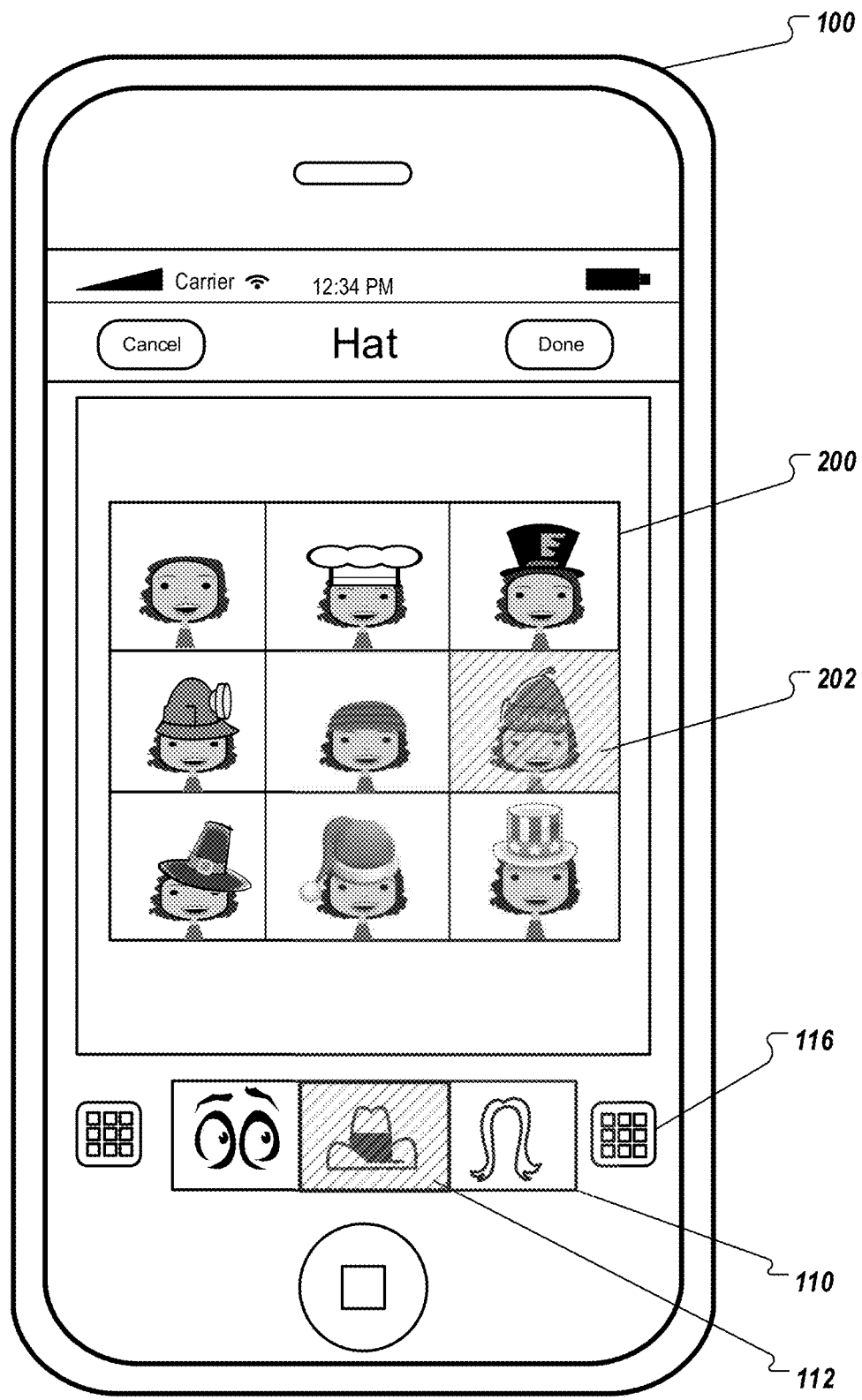
FIG. 2A illustrates an exemplary element picker for selecting avatar elements from a category of avatar elements.

FIG. 2A illustrates an exemplary element picker for selecting avatar elements from a category of avatar elements. In the example shown, the user has touched or otherwise interacted with element picker icon 116. Upon invocation of the element picker a grid view 200 is displayed. Grid view 200 can include a number of cells, where each cell displays an avatar in context with a different element selected from the category of elements. In this example, the "Hat" category was selected, resulting in each avatar displayed in a cell wearing a different hat.

In some implementations, one cell (e.g., top left corner cell in FIG. 2A) can display avatar 106 without the element (e.g., without a hat) for comparison with other cells. Another cell (e.g., center cell) can display avatar 106 with the currently selected element (e.g., the currently selected hat). In some implementations, each cell can contain a snapshot image of a 3D avatar model to capture appropriate lighting and shadows to provide a 3D effect. In other implementations, each cell can contain a 2D image of the avatar (e.g., front facing view). The user can select an element by touching or otherwise interacting with the cell displaying the desired element. In this example, the user has touched the third cell in the middle row grid view 200, where the avatar is shown wearing a "Canada" ski hat. The selected cell can be visually enhanced (e.g., highlighted, colored) to indicate its selected status. Touching the "Done" button can return the user to user interface 104 of the avatar editing environment.

The elements can be displayed in grid view 200 in a variety of ways. Avatars can be displayed in cells based on element type. For example, holiday hats can be displayed in the same row or column of grid view 200. In FIG. 2A, holiday hats for Thanksgiving, Christmas and Independence Day are displayed in the third row of grid view 200. Grid view 200 can be paginated so that a swipe gesture or other gesture can be used to display a new page with a new grid view. In some implementations, grid view 200 can be updated with new elements in response to a motion gesture. For example, when the user shakes device 100 or other motion gesture, a new grid view can be displayed with different elements from the currently selected category. An accelerometer or other motion sensor onboard device 100 can be used to detect motion. The new elements displayed in cells of the new grid view can be randomly selected based on other elements of avatar 106. For example, eye color, hair color and skin color can be used to select fashion elements having an appropriate color or color scheme, so that the resulting avatar 106 is color coordinated. The selection of colors can be based on known color heuristics.

Exemplary Avatar Color Picker

Figure 2B:
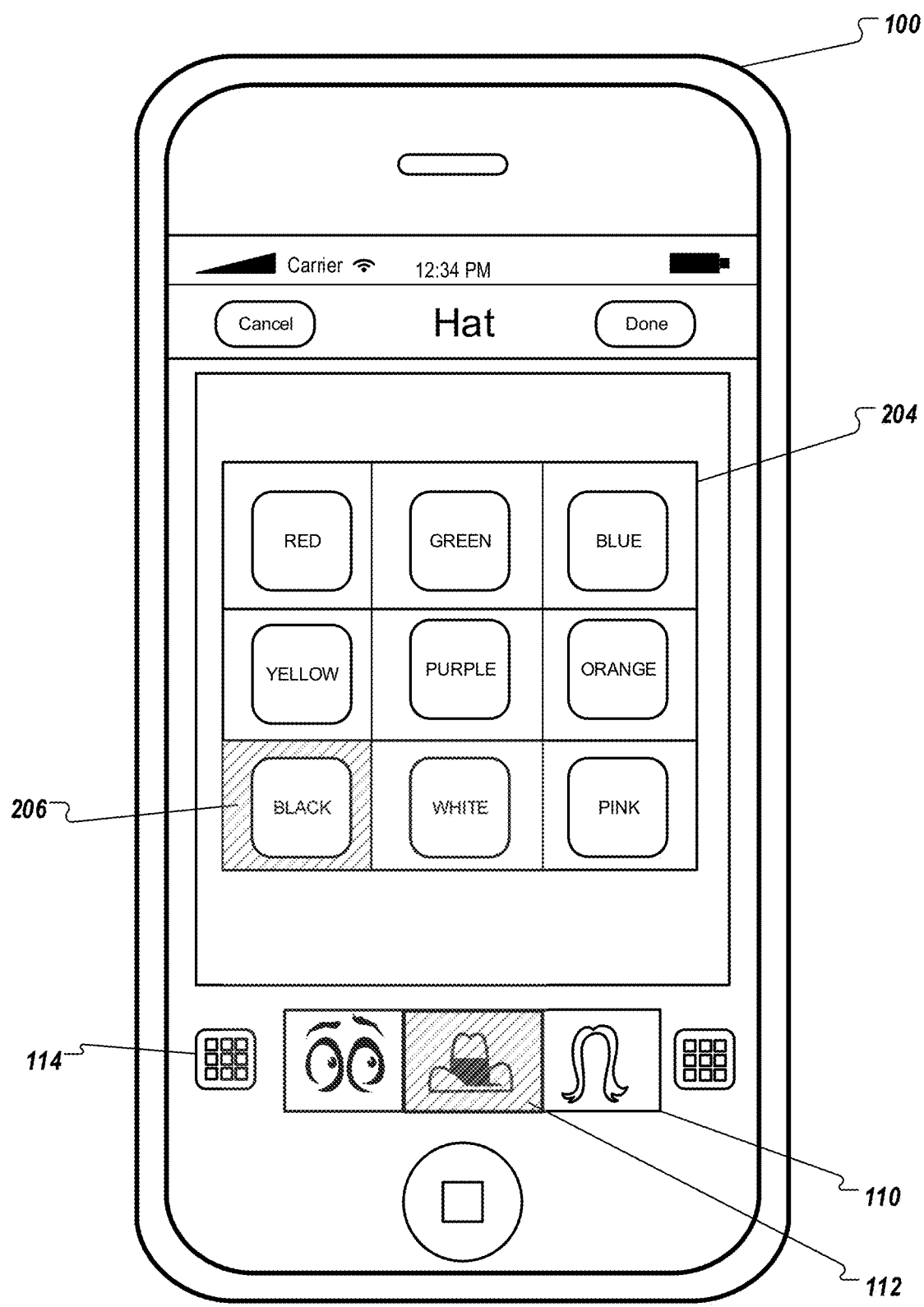
FIG. 2B illustrates an exemplary color picker for selecting a color for a category of avatar elements.

FIG. 2B illustrates an exemplary color picker for selecting a color for a category of avatar elements. In the example shown, the user has touched or otherwise interacted with color picker icon 114. Upon invocation of the color picker, a grid view 204 is displayed. Grid view 204 can include a number of cells, where each cell displays a different color. In this example, the color black was selected, resulting in each avatar displayed in cells of grid view 200 wearing a different black hat. The color selected in the color picker can be applied to all elements in the category selected by the category picker. In some implementations, the colors selected for display in grid view 204 can be limited based on the category selected. For example, if the "Nose" category is selected, then grid view 204 may display different skin tones. If the "Eyes" category is selected, then grid view 204 may display various shades of blue, green, brown and hazel, etc.

Exemplary Manual Editing of Avatar Elements

Figure 3A:
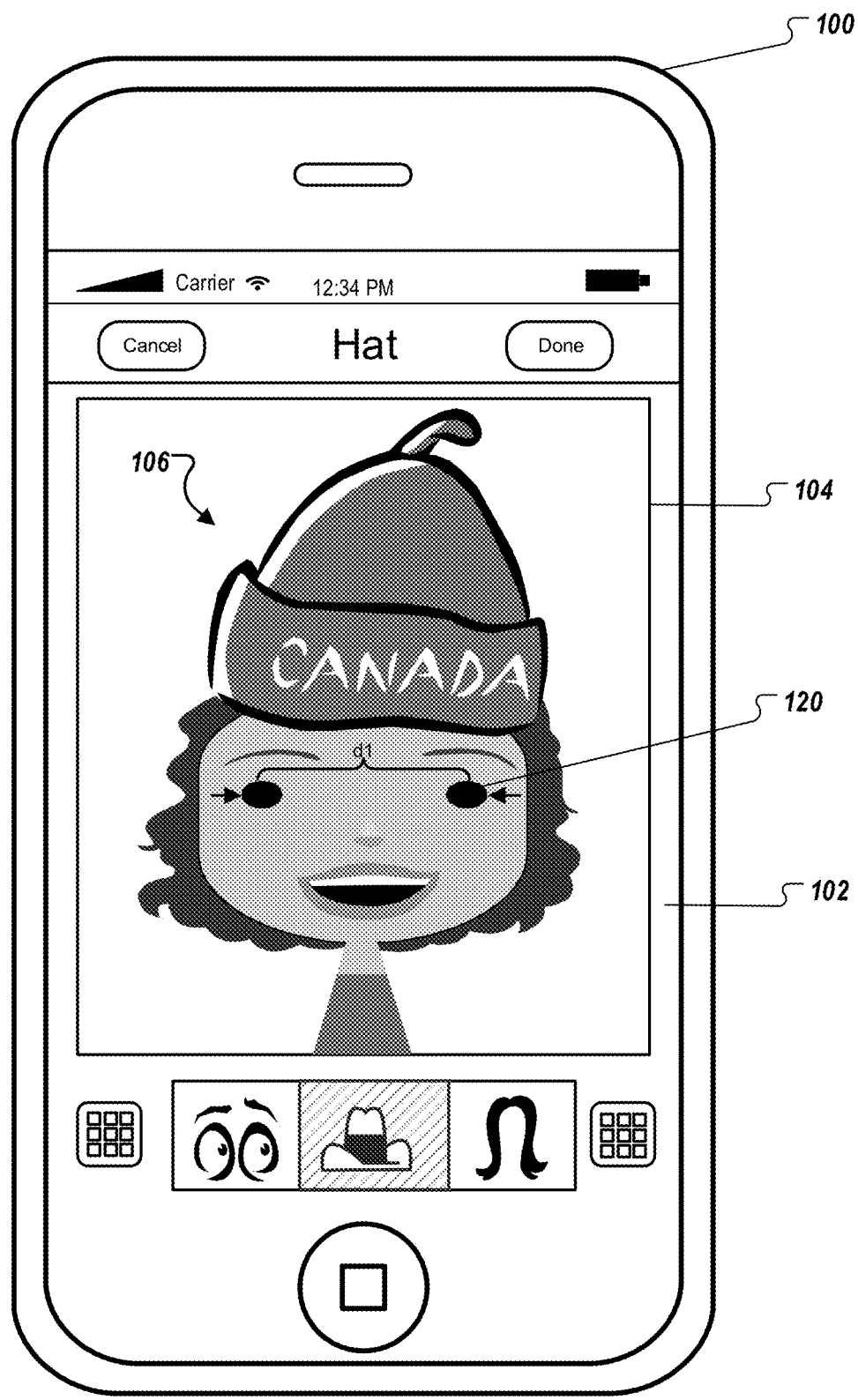
FIGS. 3A-3C illustrates exemplary processes for manually editing avatar elements.
Figure 3B:
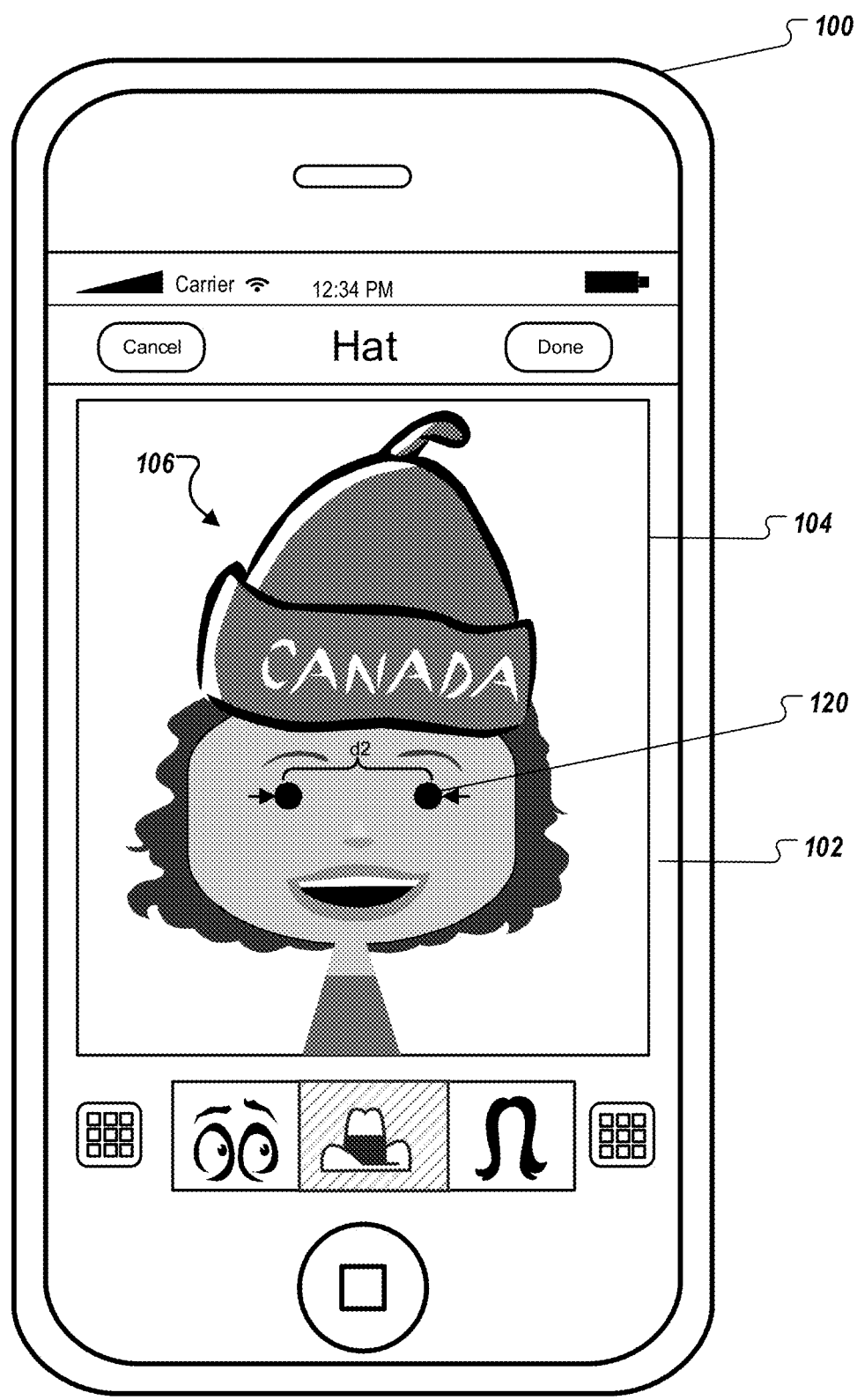
Figure 3C:
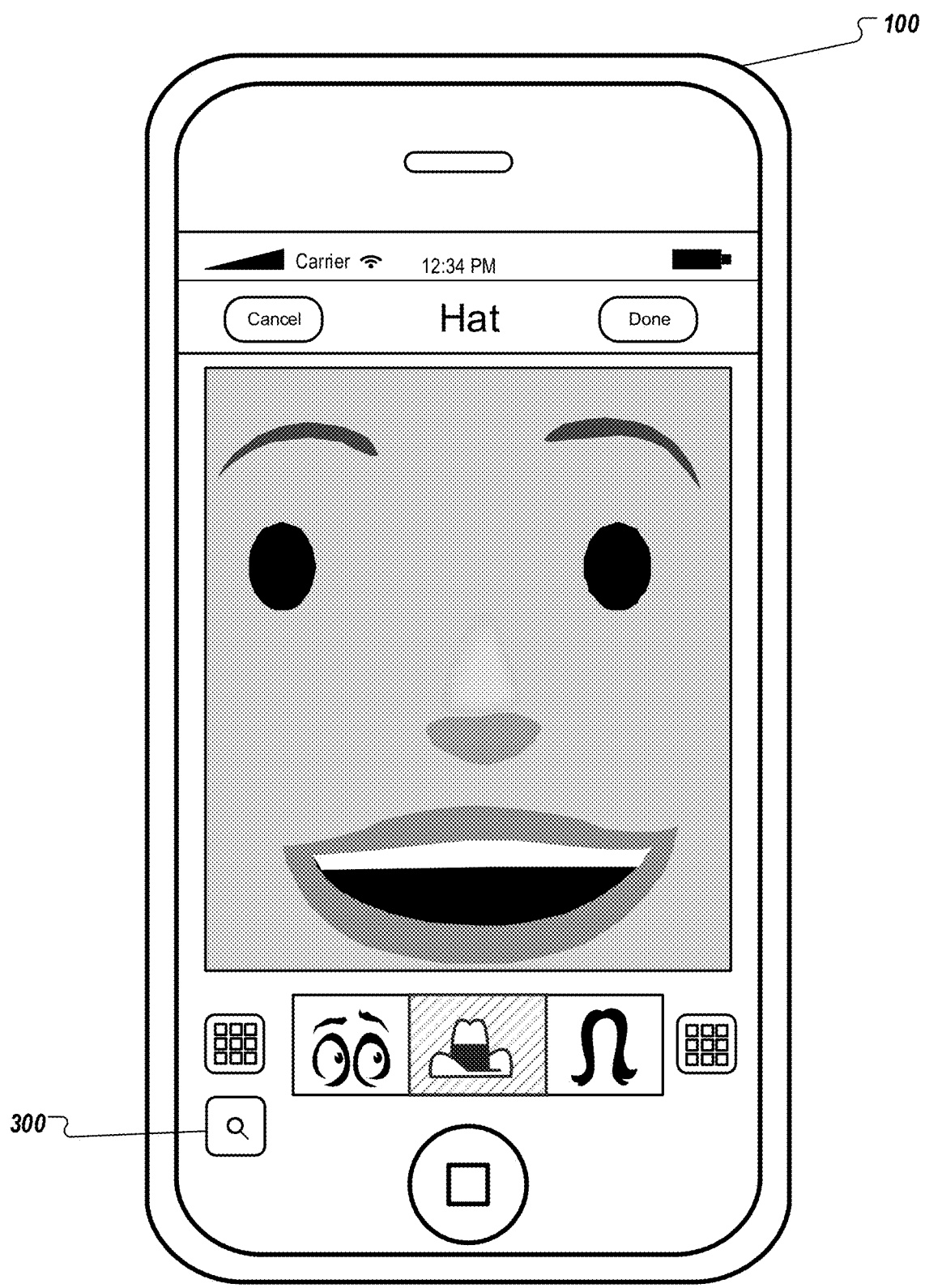

FIGS. 3A-3C illustrate exemplary processes for manually editing avatar elements. After the user has created a custom avatar by selecting and adding elements, the user can manually edit those elements in user interface 104.

In some implementations, the user can apply touch input and gestures to resize, rotate and position the elements of avatar 106. In the example shown, the user resized eyes element 120 by touching eyes element 120 at points indicated by arrows and making a pinching gesture in the direction of the arrows. FIG. 3B shows the result of the pinching gesture. In this example, eyes element 120 had a distance of d1 between the eyes before pinching (FIG. 3A) and a distance of d2 between the eyes after pinching (FIG. 3B), where d1>d2. For elements that have symmetry (e.g., eyes, ears), the symmetry can be maintained without user intervention during manual editing to assist the user in editing. In devices without a touch sensitive display, mouse controls can be used to resize, rotate and position elements on avatar 106.

Referring to FIG. 3C, the user can zoom on any of the elements of avatar 106 in user interface 104 for more refined manual editing. In some implementations, the element is automatically zoomed in response to a user touching the element. Multiple taps can change the zoom level increments where one zoom or magnification level change occurs for each tap. Alternatively, a reverse pinching gesture (spreading apart two fingers) can be used zoom elements of avatar 106. In other implementations, the user can zoom on a particular element using zoom button 300. Other zoom controls can also be used including, for example, a magnifying glass tool.

Exemplary Alternative Avatar Element Picker

Figure 4A:
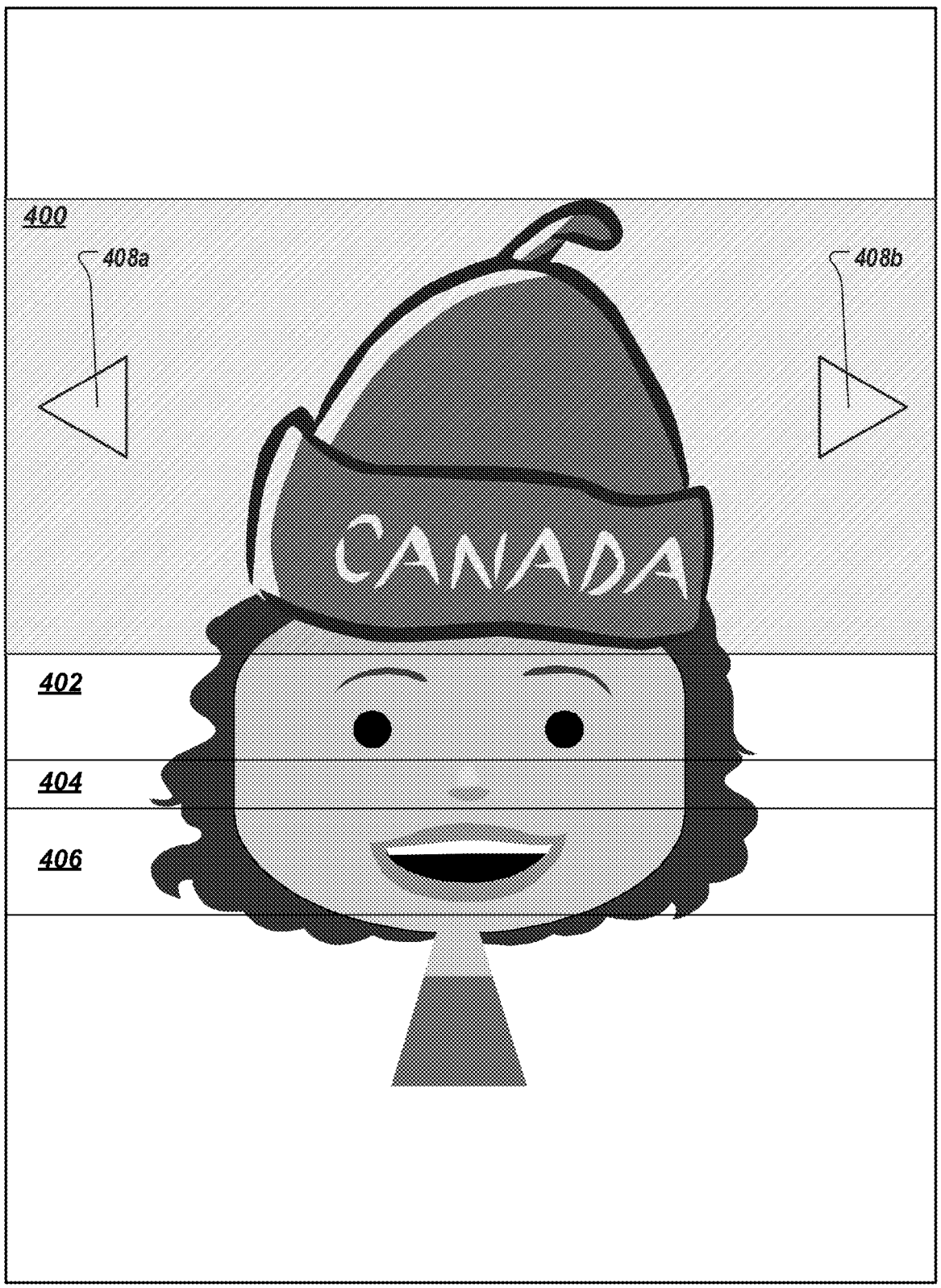
FIGS. 4A and 4B illustrate an alternative element picker for selecting avatar elements from a category of avatar elements.
Figure 4B:
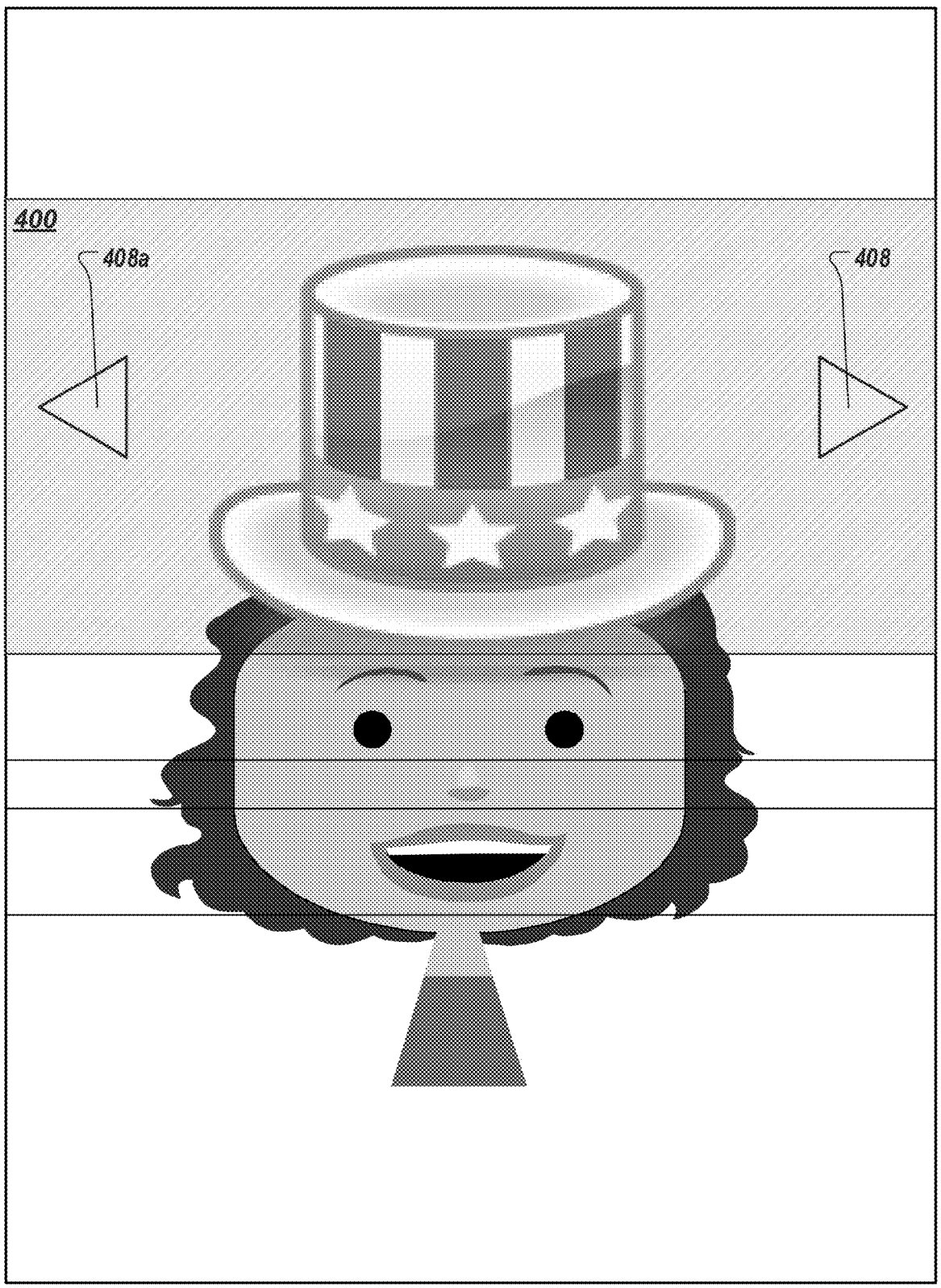

FIGS. 4A and 4B illustrate an alternative element picker for selecting avatar elements from a category of avatar elements. In some implementations, an avatar is divided into editing zones 400-406. In the example shown, zone 400 includes the hat, zone 402 includes the eyes, zone 404 includes the nose, zone 406 includes the mouth. Other zones are also possible. When a user wants to edit a particular element of the avatar, the user selects the corresponding zone containing the element. On a device with a touch sensitive display, the user can touch any portion of the zone to activate the zone. In the example shown, the user activated zone 400 containing the hat. Upon activation, buttons 408a, 408b can be displayed for selecting different hats. When a left or right button 408 is touched, a new hat slides in from the left or right of the display, respectively. Implementations using other animations or no animations are also possible. FIG. 4B shows the avatar with a new hat after activation of button 408.

Exemplary Manual Editing With Editing Regions

Figure 5C:
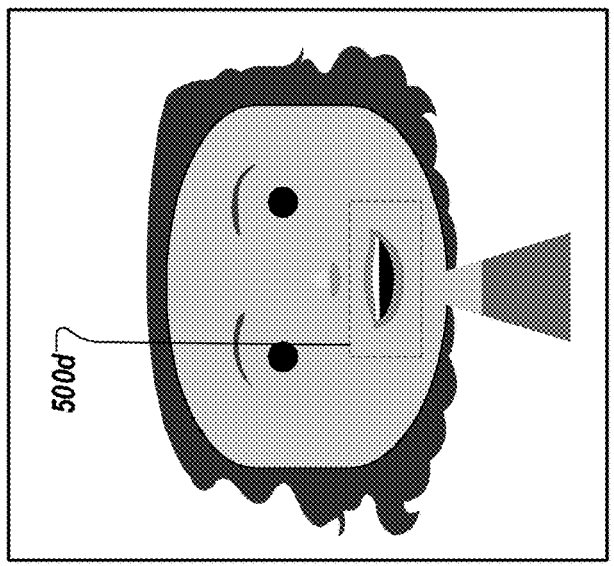
FIGS. 5A-5C illustrate editing regions for manually editing avatar elements.
Figure 5B:
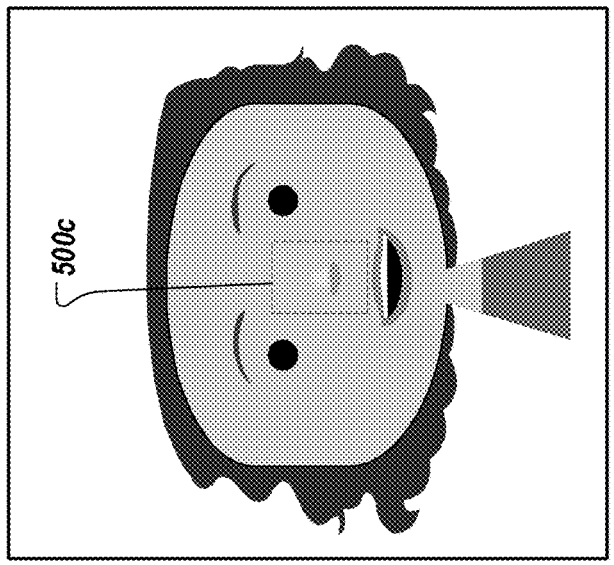
Figure 5A:
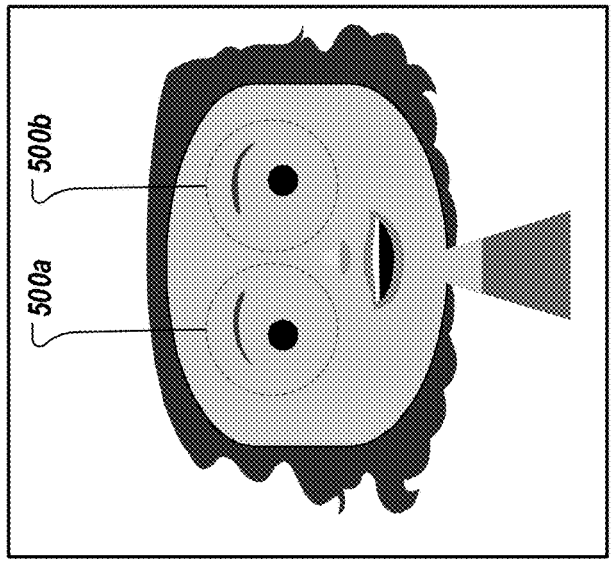

FIGS. 5A-5C illustrate editing regions for editing avatar elements in the avatar editing environment. In some implementation, manual edits made by a user to an element can restricted to defined editing regions. Using touch input or gestures, for example, the user can resize, stretch or move elements within the editing region. In some implementations, if the user resizes, stretches or moves an element out of the editing region, the element will "snap back" to the editing region. Alternatively, the element can bounce off a virtual wall or bumper defining the boundary of the editing region when the user attempts to resize, stretch or move the element outside the editing region. Restricting manual edits to defined editing regions can help a user in creating custom avatars.

Referring to FIGS. 5A-5C, editing regions 500a, 500b contain the left and right eyes of the avatar. The user can move, rotate or resize the eyes anywhere within their respective editing regions 500a, 500b. In this example, the editing regions 500a, 500b are circular regions. Editing regions 500a, 500b, however, can be any closed polygon, including but not limited to circles, squares, rectangles and triangles. FIG. 5B illustrates a rectangular editing region 500c for the nose of the avatar. The user can move, rotate, or resize the nose anywhere within the editing region 500c. FIG. 5C illustrates a rectangular editing region 500d for the mouth of the avatar. The user can move, rotate or resize the mouth anywhere within the editing region 500d.

Exemplary Avatar Animation

Figure 6B:
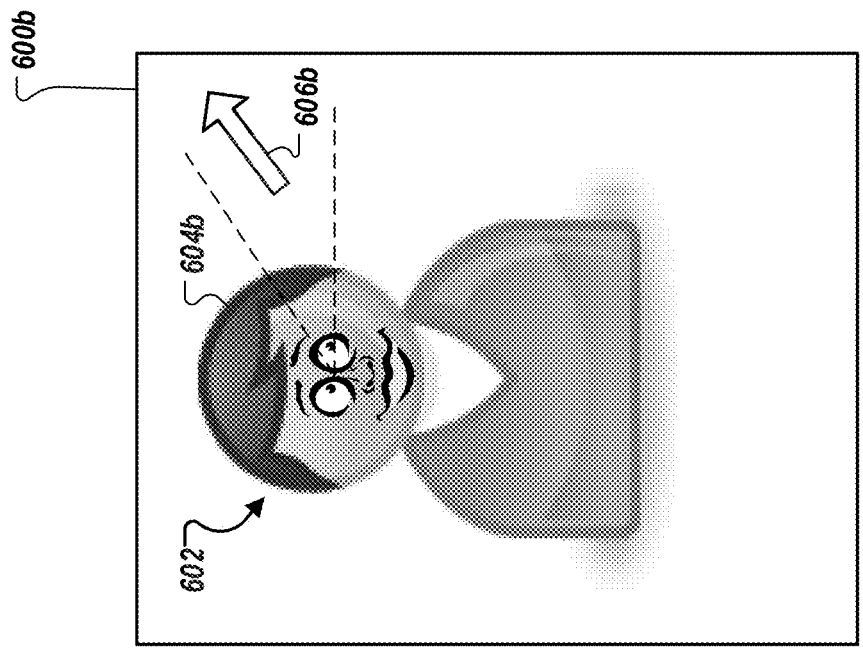
FIGS. 6A-6B illustrate animating avatar elements to track objects in a user interface or indicate direction.
Figure 6A:
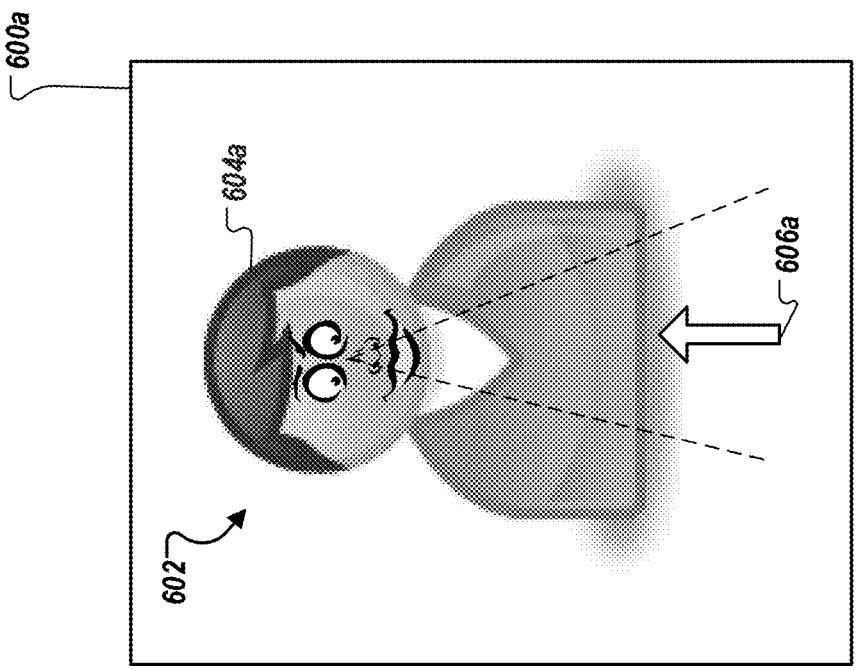

FIGS. 6A-6B illustrate animating avatar elements to track objects in a user interface. In some implementations, elements added to an avatar can be animated. For example, elements (e.g., eyes, mouths, ears, eyebrows) can be animated to simulate human facial expressions, such as happy, sad, angry, surprise, boredom contemplation or any other human facial expression. Animations can also be applied to avatar body parts (e.g., legs, arms, head) to allow the avatar to express itself through fully body movements (e.g., a dancing avatar).

In some implementations, animations for elements can be selected and previewed in the avatar editing environment. In some implementations, the user can select (e.g., select from a menu) a particular animation for a particular element. In other implementations, the use can set the animations to trigger in response to various trigger events. Some examples of trigger events can be user actions or context. In an email or text messaging application, if the user is waiting for a response from another user, their avatar can be animated to appear to be waiting or sleeping. For example, the avatar's eyes can be closed and the chest animated to contract and expand to simulate slow, deep breathing associated with sleeping. With a full body avatar, the avatar can be animated to tap its foot (perhaps with its arms crossed as well) simulate waiting or impatience.

Referring to FIGS. 6A and 6B, the eyes of avatar 602 can be animated to track a cursor 606 in a user interface 600. In user interface 600a, avatar 602 is looking down at cursor 606a. In interface 600b, avatar 602 is looking up and to the right at cursor 606b. The eyes of avatar 602 can be animated independently of each other and other elements, such as eyebrows. In some implementations, an avatar animation engine (e.g., 712) can register with an operation system (e.g., OS 708) to receive trigger events or position information, such as cursor coordinates. In some implementations, a line-of-sight vector from the eyes to the cursor can be computed in display coordinates using vector algebra. The line of sight vector can then be used by animation engine 712 to animate the eyes of avatar 602 to create the illusion that avatar 602 is tracking cursor 606 with its eyes as cursor 606 moves about user interface 600.

Avatar animations can be used in variety of applications, including but not limited to address books, chat sessions, video conferencing, email, games or any other application that can support an animated avatar. In an address book application, when a user receives an avatar with a video card (Vcard) from another individual, the avatar can "come alive" and follow the movement of a cursor with its eyes, head and/or body when the Vcard is opened. In a video chat environment, each party can be represented by an avatar rather than a digital image. Each party can use the avatar to track the other party's movement by controlling their respective avatar's eyes, head and body to follow the other party's avatar in a video chat room. In some implementations, an avatar viewing angle can mimic camera position.

Exemplary Software Architecture

Figure 7A:
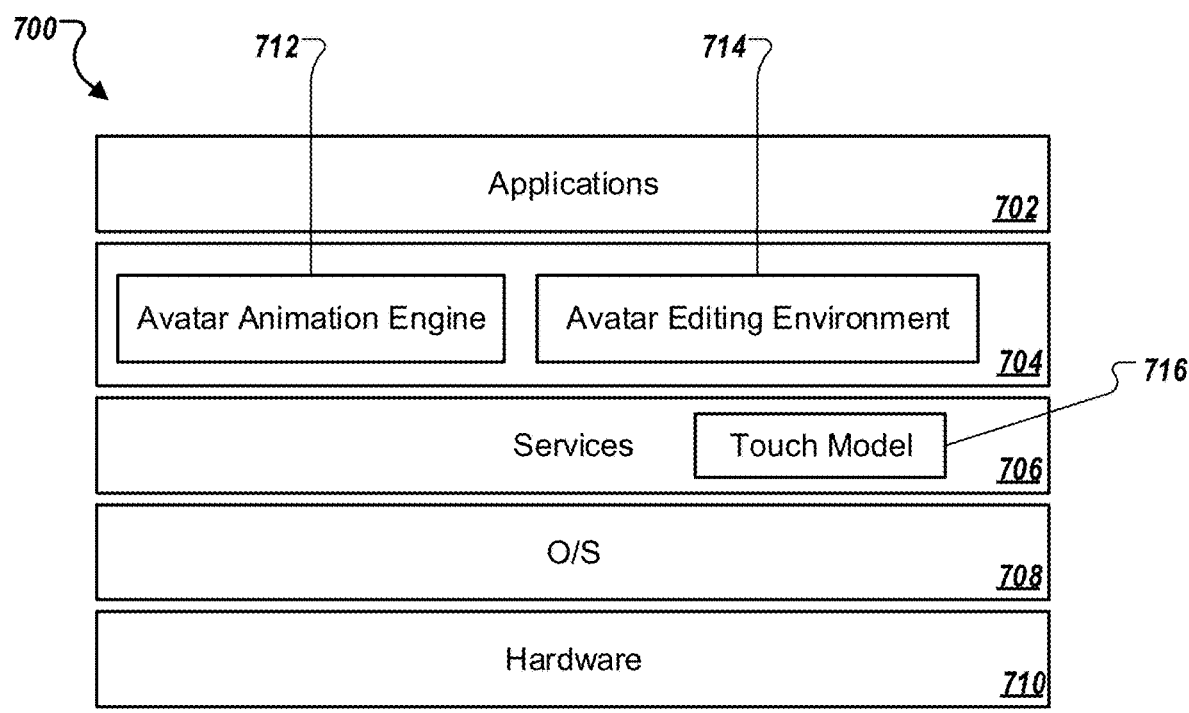
FIGS. 7A-7C is an exemplary software architecture for implementing the avatar editing environment and animation described in reference to FIGS. 1-6.

FIG. 7A is an exemplary software architecture for implementing the avatar editing environment and animation described in reference to FIGS. 1-6. In some implementations, the avatar editing environment can be part of a framework in a software architecture or stack. An exemplary software stack 700 can include an applications layer 702, framework layer 704, services layer 706, OS layer 708 and hardware layer 710. Applications (e.g., email, text messaging, games) can incorporate the avatar editing environment through the use of an Application Programming Interfaces (API). Framework layer 704 can include avatar animation engine 712 and avatar editing environment 714. Avatar animation engine 712 can handle animation of avatar elements, such as the animations described in reference to FIGS. 6A and 6B. Animation engine 712 can make API calls to graphics and animations services or libraries in services layer 706 or OS layer 708 to perform all or some of its tasks. Avatar editing environment 714 can provide the user interfaces and features described in reference to FIGS. 1-5. Avatar editing environment 714 can make API calls to services or libraries in services layer 706 or OS layer 708 to perform all or some of its tasks.

Services layer 706 can provide various graphics, animations and UI services to support animation engine 712, avatar editing environment 714 and applications in applications layer 702. In some implementations, services layer 706 includes touch model 716 for interpreting and mapping raw touch data from a touch sensitive device to touch events (e.g., gestures, rotations), which can be accessed by applications and by avatar editing environment 714 using call conventions defined in a touch model API. Services layer 706 can also include communications software stacks for wireless communications.

OS layer 708 can be a complete operating system (e.g., MAC OS) or a kernel (e.g., UNIX kernel). Hardware layer 710 includes hardware necessary to perform the tasks described in reference to FIGS. 1-6, including but not limited to: processors or processing cores (including application and communication baseband processors), dedicated signal/image processors, ASICs, graphics processors (e.g., GNUs), memory and storage devices, communication ports and devices, peripherals, etc.

Software stack 700 can be included on a mobile device capable of executing software applications. An API specification describing call conventions for accessing API functions can be used by application developers to incorporate avatar editing and animation in applications.

One or more Application Programming Interfaces (APIs) may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments, the application or client program may incorporate calls to functions or methods provided by the SDK and provided by the API, or use data types or objects defined in the SDK and provided by the API. An Application Framework may, in these embodiments, provides a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 7B:
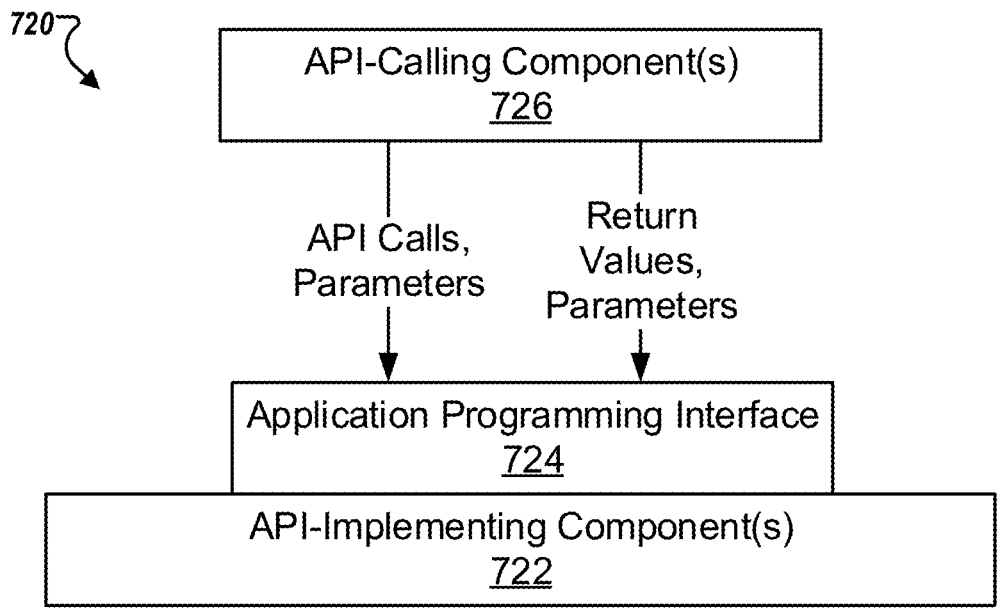

FIG. 7B is a block diagram illustrating an exemplary API architecture, which may be used in some embodiments of the invention. As shown in FIG. 7B, the API architecture 720 includes the API-implementing component 722 (e.g., an operating system, a library, a device driver, an API, an application program, software or other module) that implements the API 724. The API 724 specifies one or more functions, methods, classes, objects, protocols, data structures, formats and/or other features of the API-implementing component that may be used by the API-calling component 726. The API 724 can specify at least one calling convention that specifies how a function in the API-implementing component receives parameters from the API-calling component and how the function returns a result to the API-calling component. The API-calling component 726 (e.g., an operating system, a library, a device driver, an API, an application program, software or other module), makes API calls through the API 724 to access and use the features of the API-implementing component 722 that are specified by the API 724. The API-implementing component 722 may return a value through the API 724 to the API-calling component 726 in response to an API call.

It will be appreciated that the API-implementing component 722 may include additional functions, methods, classes, data structures, and/or other features that are not specified through the API 724 and are not available to the API-calling component 726. It should be understood that the API-calling component 726 may be on the same system as the API-implementing component 722 or may be located remotely and accesses the API-implementing component 722 using the API 724 over a network. While FIG. 7B illustrates a single API-calling component 726 interacting with the API 724, it should be understood that other API-calling components, which may be written in different languages (or the same language) than the API-calling component 726, may use the API 724.

The API-implementing component 722, the API 724, and the API-calling component 726 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 7C:
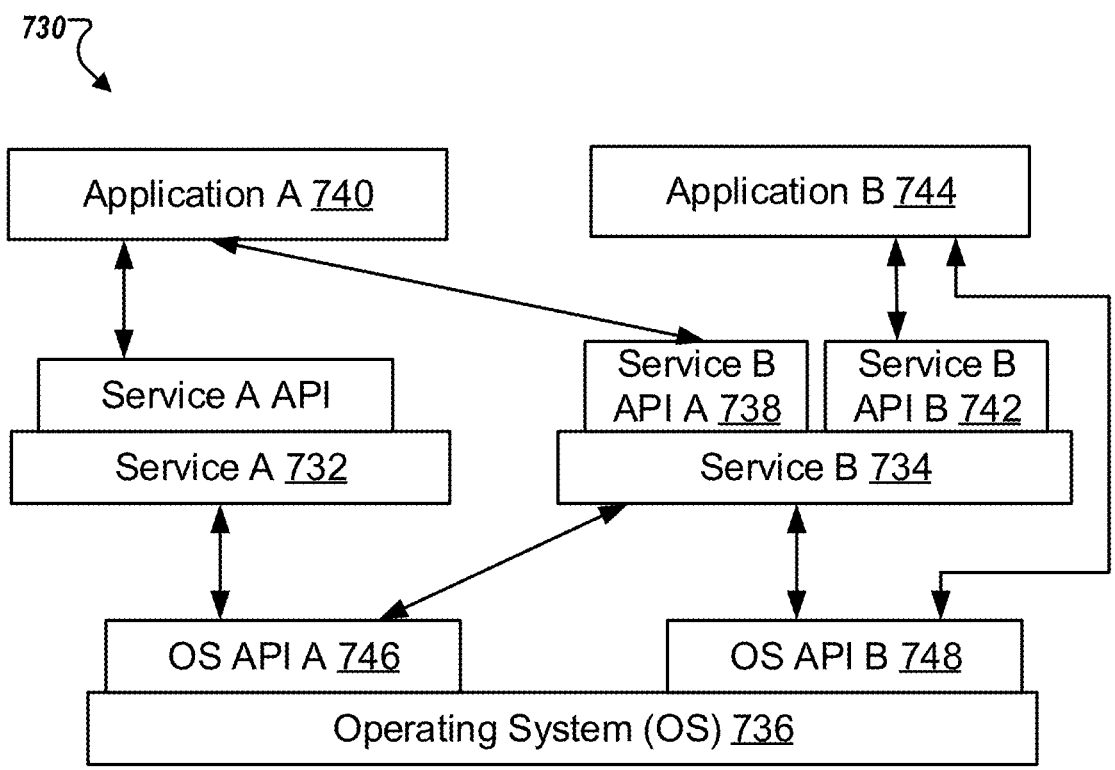

In FIG. 7C ("Software Stack" 730), an exemplary embodiment, applications can make calls to Service A 732 or Service B 734 using several Service APIs (Service API A and Service API B) and to Operating System (OS) 736 using several OS APIs. Service A 732 and service B 734 can make calls to OS 736 using several OS APIs.

Note that the Service B 734 has two APIs, one of which (Service B API A 738) receives calls from and returns values to Application A 740 and the other (Service B API B 742) receives calls from and returns values to Application B 744. Service A 732 (which can be, for example, a software library) makes calls to and receives returned values from OS API A 746, and Service B 734 (which can be, for example, a software library) makes calls to and receives returned values from both OS API A 746 and OS API B 748. Application B 744 makes calls to and receives returned values from OS API B 748.

Exemplary Avatar Editing Process

Figure 8:
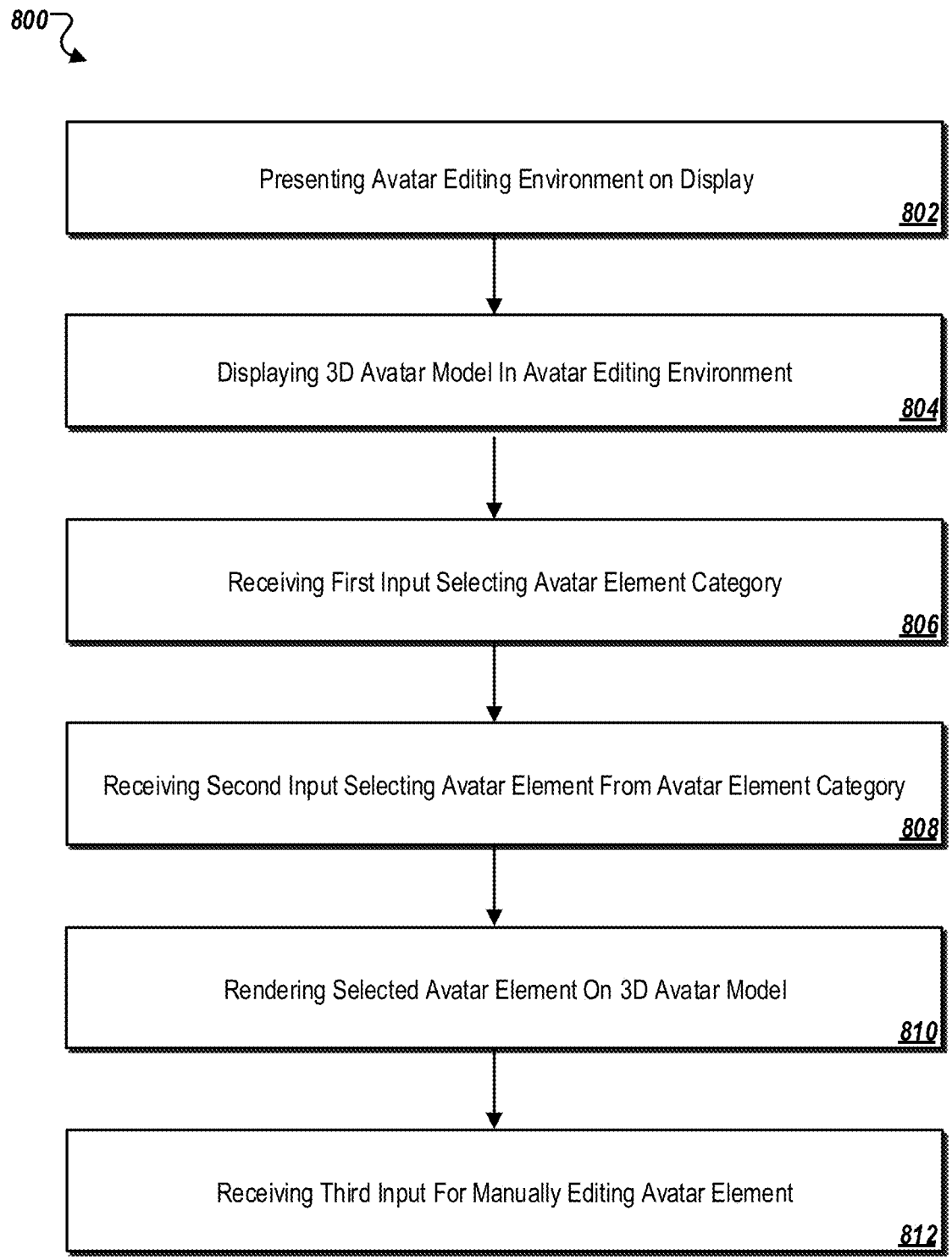
FIG. 8 is a flow diagram of an exemplary process for creating an avatar in an avatar editing environment.

FIG. 8 is a flow diagram of an exemplary process 800 for creating an avatar in an avatar editing environment. Process 800 can be described in reference to a system for implementing the process, such as the avatar editing environment described in reference to FIGS. 1-7.

In some implementations, process 800 can begin by presenting an avatar editing environment on a display of a device (802) and displaying an avatar model in the environment (804). The avatar model can be a 2D or 3D model. The display can be a touch sensitive display. The avatar model can be displayed with a blank face or a default avatar with predefined elements can be displayed based on information previously gathered from the user.

First input is received selecting an avatar element category (806). In some implementations, a category picker can be used such as the category picker described in reference to FIGS. 1A-1E.

Second input is received selecting an element from the selected element category (808). In some implementations, an element picker can be used such as the element picker described in reference to FIGS. 1A-1E and FIGS. 4A and 4B.

After an element is selected, the element can be automatically rendered on-the-fly on the avatar model (810). In some implementations, elements can be 2D textures that are rendered on a 3D avatar model.

A third input is received for manually editing an element of the avatar (812). The third input can be a touch input or gesture focused on the element to be edited. Manual editing can include resizing, rotating and positioning the element. Manual editing can be restricted to editing regions. Manual editing can include zooming or magnifying an element for more refined editing.

Exemplary Mobile Device Architecture

Figure 9:
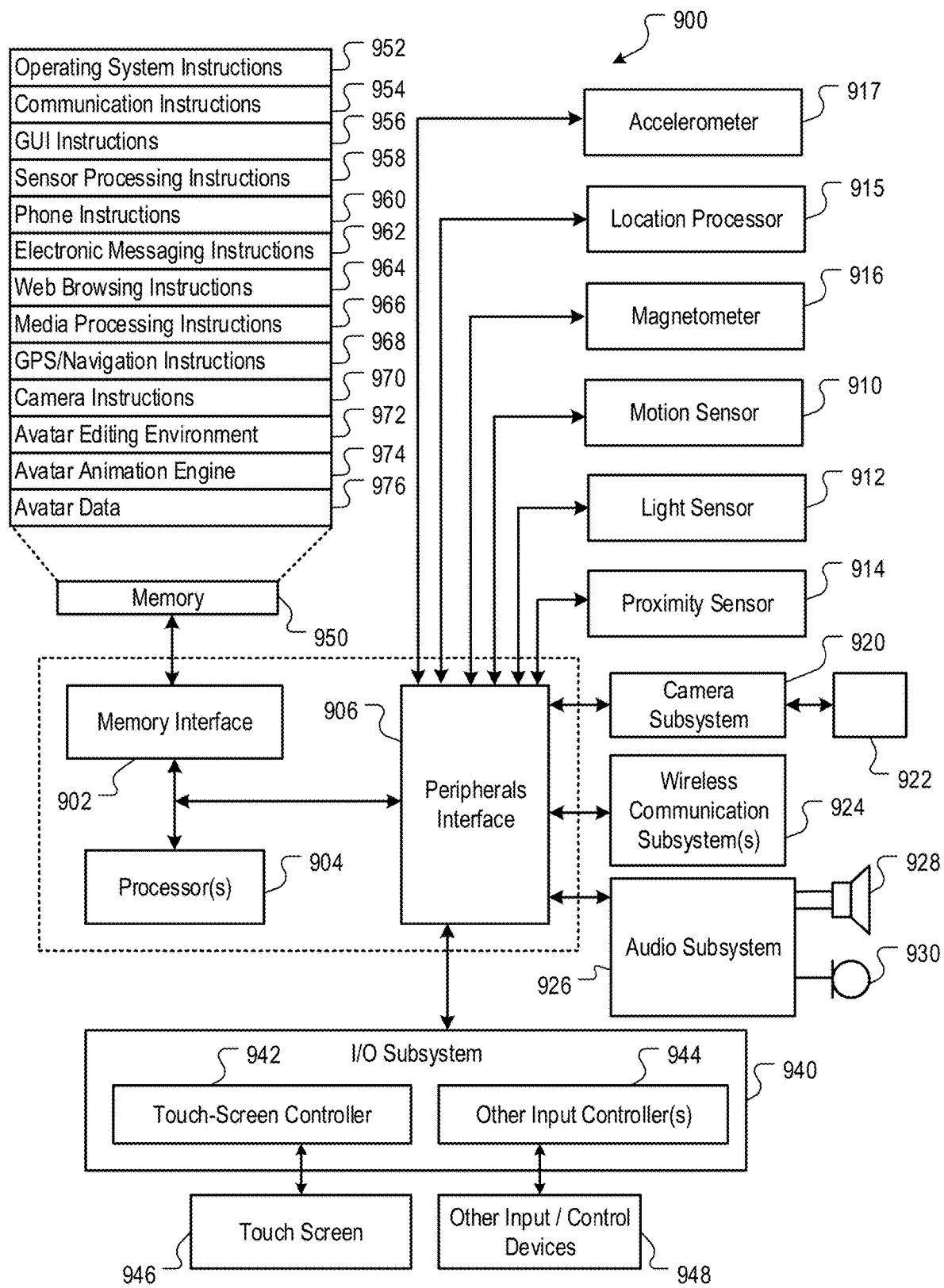
FIG. 9 is a block diagram of an exemplary hardware architecture for implementing the avatar editing environment and animation described in reference to FIGS. 1-8.

FIG. 9 is a block diagram of an exemplary hardware architecture for a device implementing the avatar editing environment and animation described in reference to FIGS. 1-8. The device can include memory interface 902, one or more data processors, image processors and/or processors 904, and peripherals interface 906. Memory interface 902, one or more processors 904 and/or peripherals interface 906 can be separate components or can be integrated in one or more integrated circuits. The various components in the device, for example, can be coupled by one or more communication buses or signal lines.

Sensors, devices, and subsystems can be coupled to peripherals interface 906 to facilitate multiple functionalities. For example, motion sensor 910, light sensor 912, and proximity sensor 914 can be coupled to peripherals interface 906 to facilitate orientation, lighting, and proximity functions of the mobile device. Location processor 915 (e.g., GPS receiver) can be connected to peripherals interface 906 to provide geopositioning. Electronic magnetometer 916 (e.g., an integrated circuit chip) can also be connected to peripherals interface 906 to provide data that can be used to determine the direction of magnetic North. Thus, electronic magnetometer 916 can be used as an electronic compass. Accelerometer 917 can also be connected to peripherals interface 906 to provide data that can be used to determine change of speed and direction of movement of the mobile device.

Camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which a mobile device is intended to operate. For example, a mobile device can include communication subsystems 924 designed to operate over a GSM network, a GPRS network, an EDGE network, a Wi-Fi or WiMax network, and a Bluetooth network. In particular, the wireless communication subsystems 924 can include hosting protocols such that the mobile device can be configured as a base station for other wireless devices.

Audio subsystem 926 can be coupled to a speaker 928 and a microphone 930 to facilitate voice-enabled functions, such as voice recognition, voice replication, digital recording, and telephony functions.

I/O subsystem 940 can include touch screen controller 942 and/or other input controller(s) 944. Touch-screen controller 942 can be coupled to a touch screen 946 or pad. Touch screen 946 and touch screen controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 946.

Other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of speaker 928 and/or microphone 930.

In one implementation, a pressing of the button for a first duration may disengage a lock of the touch screen 946; and a pressing of the button for a second duration that is longer than the first duration may turn power to the device on or off. The user may be able to customize a functionality of one or more of the buttons. The touch screen 946 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can also be used.

Memory interface 902 can be coupled to memory 950. Memory 950 can include high-speed random access memory and/or non-volatile memory, such as one or more magnetic disk storage devices, one or more optical storage devices, and/or flash memory (e.g., NAND, NOR). Memory 950 can store operating system 952, such as Darwin, RTXC, LINUX, UNIX, OS X, WINDOWS, or an embedded operating system such as VxWorks. Operating system 952 may include instructions for handling basic system services and for performing hardware dependent tasks. In some implementations, operating system 952 can include a kernel (e.g., UNIX kernel).

Memory 950 may also store communication instructions 954 to facilitate communicating with one or more additional devices, one or more computers and/or one or more servers. Memory 950 may include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GPS/Navigation instructions 968 to facilitate GPS and navigation-related processes and instructions; and camera instructions 970 to facilitate camera-related processes and functions. The memory 950 may also store other software instructions (not shown), such as security instructions, web video instructions to facilitate web video-related processes and functions, and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 950.

Memory 950 can include instructions for avatar editing environment 972 and avatar animation engine 974. Memory 950 can be a local cache for avatar data 976 that results from the avatar editing process.

Each of the above identified instructions and applications can correspond to a set of instructions for performing one or more functions described above. These instructions need not be implemented as separate software programs, procedures, or modules. Memory 950 can include additional instructions or fewer instructions. Furthermore, various functions of the mobile device may be implemented in hardware and/or in software, including in one or more signal processing and/or application specific integrated circuits.

Exemplary Operating Environment

Figure 10:
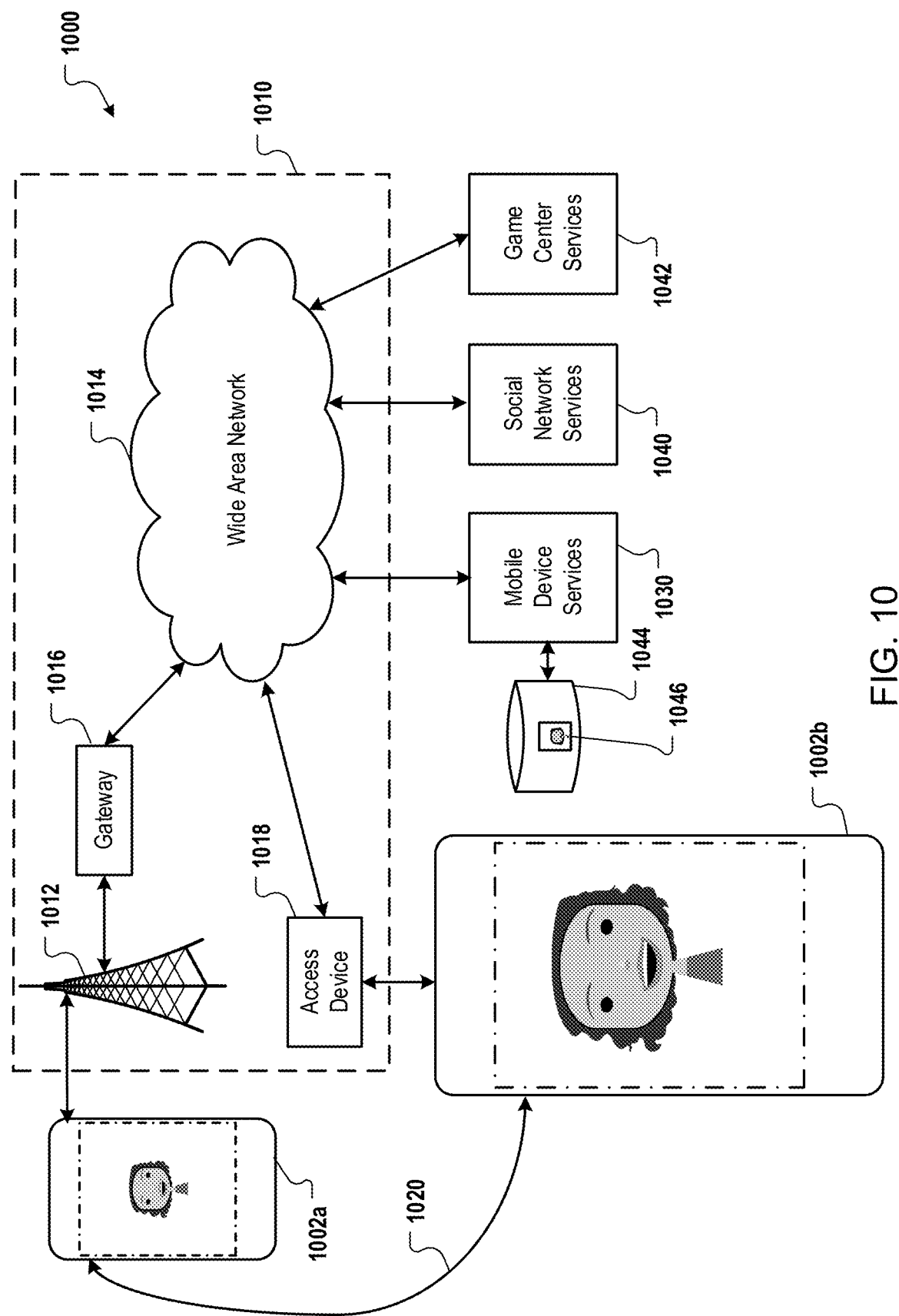
FIG. 10 is a block diagram of an exemplary network operating environment for a device employing the avatar editing environment and animation described in reference to FIGS. 1-9.

FIG. 10 is a block diagram of an exemplary network operating environment for a device employing the avatar editing environment and animation described in reference to FIGS. 1-8. In this example, devices 1002*a* and 1002*b* can, for example, communicate over one or more wired and/or wireless networks 1010 in data communication. For example, a wireless network 1012, e.g., a cellular network, can communicate with a wide area network (WAN) 1014, such as the Internet, by use of a gateway 1016. Likewise, an access device 1018, such as an 802.11g wireless access device, can provide communication access to the wide area network 1014. Although this example illustrates an operating environment for mobile devices, the operating environment can also be applied to a device that is wired to a network (e.g., a desktop computer).

In some implementations, both voice and data communications can be established over wireless network 1012 and the access device 1018. For example, mobile device 1002*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1012, gateway 1016, and wide area network 1014 (e.g., using Transmission Control Protocol/Internet Protocol (TCP/IP) or User Datagram Protocol (UDP)). Likewise, in some implementations, the mobile device 1002*b* can place and receive phone calls, send and receive e-mail messages, and retrieve electronic documents over the access device 1018 and the wide area network 1014. In some implementations, device 1002*a* or 1002*b* can be physically connected to the access device 1018 using one or more cables and the access device 1018 can be a personal computer. In this configuration, device 1002*a* or 1002*b* can be referred to as a "tethered" device.

Devices 1002*a* and 1002*b* can also establish communications by other means. For example, wireless device 1002*a* can communicate with other wireless devices, e.g., other devices 1002*a* or 1002*b*, cell phones, etc., over the wireless network 1012. Likewise, devices 1002*a* and 1002*b* can establish peer-to-peer communications 1020, e.g., a personal area network, by use of one or more communication subsystems, such as the Bluetooth™ communication devices. Other communication protocols and topologies can also be implemented.

Device 1002*a* or 1002*b* can communicate with a variety of services over the one or more wired and/or wireless networks. In some implementations, services can include mobile device services 1030, social network services 1040, and game center services 1042.

Mobile device services 1030 can provide a variety of services for device 1002*a* or 1002*b*, including but not limited to mail services, text messaging, chat sessions, videoconferencing, Internet services, location based services (e.g., map services), sync services, remote storage 1044, downloading services, etc. Remote storage 1046 can be used to store avatar data, which can be used on multiple devices of the user or shared by multiple users. In some implementations, an avatar editing environment can be provided by one or more of the services 1030, 1040, 1042, which can be accessed by a user of device 1002*a* or 1002*b* through, for example, web pages served by one or more servers operated by the services 1030, 1040, 1042.

In some implementations, social networking services 1040 can provide a social networking website, where a user of device 1002*a* or 1002*b* can set up a personal network and invite friends to contribute and share content, including avatars and avatar related items. A user can use their custom avatar made with an avatar editing environment in place of a digital photo to protect their privacy.

In some implementations, game center services 1042 can provide an online gaming environment, where users of device 1002*a* or 1002*b* can participate in online interactive games with their avatars created using the avatar editing environment described in reference to FIGS. 1-7. In some implementations, avatars and/or elements created by an avatar editing environment can be shared among users or sold to players of online games. For example, an avatar store can be provided by game center services 1042 for users to buy or exchange avatars and avatar related items (e.g., clothes, accessories).

Device 1002*a* or 1002*b* can also access other data and content over the one or more wired and/or wireless networks. For example, content publishers, such as news sites, Rally Simple Syndication (RSS) feeds, web sites, blogs, social networking sites, developer networks, etc., can be accessed by device 1002*a* or 1002*b*. Such access can be provided by invocation of a web browsing function or application (e.g., a browser) in response to a user touching, for example, a Web object.

Figure 11:
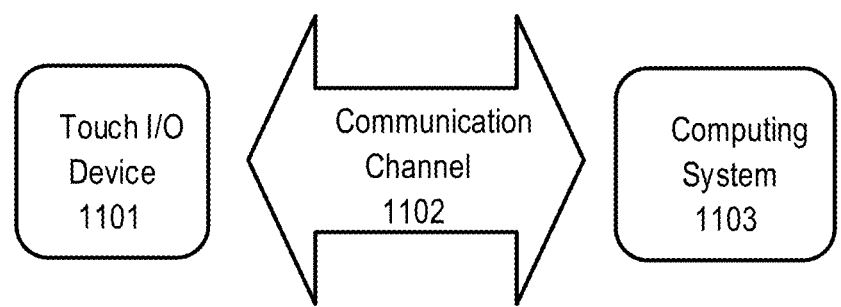
FIG. 11 is block diagrams illustrating communication between an exemplary Touch I/O device and a computing system.

Described embodiments may include touch I/O device 1101 that can receive touch input for interacting with computing system 1103 (FIG. 11) via wired or wireless communication channel 1102. Touch I/O device 1101 may be used to provide user input to computing system 1103 in lieu of or in combination with other input devices such as a keyboard, mouse, etc. One or more touch I/O devices 1101 may be used for providing user input to computing system 1103. Touch I/O device 1101 may be an integral part of computing system 1103 (e.g., touch screen on a laptop) or may be separate from computing system 1103.

Touch I/O device 1101 may include a touch sensitive panel which is wholly or partially transparent, semitransparent, non-transparent, opaque or any combination thereof. Touch I/O device 1101 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensitive surface for receiving touch input.

In one example, touch I/O device 1101 embodied as a touch screen may include a transparent and/or semitransparent touch sensitive panel partially or wholly positioned over at least a portion of a display. According to this embodiment, touch I/O device 1101 functions to display graphical data transmitted from computing system 1103 (and/or another source) and also functions to receive user input. In other embodiments, touch I/O device 1101 may be embodied as an integrated touch screen where touch sensitive components/devices are integral with display components/devices. In still other embodiments, a touch screen may be used as a supplemental or additional display screen for displaying supplemental or the same graphical data as a primary display and to receive touch input.

Touch I/O device 1101 may be configured to detect the location of one or more touches or near touches on device 1101 based on capacitive, resistive, optical, acoustic, inductive, mechanical, chemical measurements, or any phenomena that can be measured with respect to the occurrences of the one or more touches or near touches in proximity to device 1101. Software, hardware, firmware or any combination thereof may be used to process the measurements of the detected touches to identify and track one or more gestures. A gesture may correspond to stationary or non-stationary, single or multiple, touches or near touches on touch I/O device 1101. A gesture may be performed by moving one or more fingers or other objects in a particular manner on touch I/O device 1101 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1103 may drive a display with graphical data to display a graphical user interface (GUI). The GUI may be configured to receive touch input via touch I/O device 1101. Embodied as a touch screen, touch I/O device 1101 may display the GUI. Alternatively, the GUI may be displayed on a display separate from touch I/O device 1101. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1101 which may be associated with the graphical elements of the GUI. In other embodiments, the user may perform gestures at one or more locations that are independent of the locations of graphical elements of the GUI. Gestures performed on touch I/O device 1101 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1103 (e.g., affect a state or mode of a GUI, application, or operating system). Gestures may or may not be performed on touch I/O device 1101 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 1102 in response to or based on the touch or near touches on touch I/O device 1101. Feedback may be transmitted optically, mechanically, electrically, olfactory, acoustically, or the like or any combination thereof and in a variable or non-variable manner.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor, and method steps can be performed by a programmable processor executing a program of instructions to perform functions of the described implementations by operating on input data and generating output. Alternatively or addition, the program instructions can be encoded on a propagated signal that is an artificially generated signal, e.g., a machine-generated electrical, optical, or electromagnetic signal, that is generated to encode information for transmission to suitable receiver apparatus for execution by a programmable processor.

Figure 12:
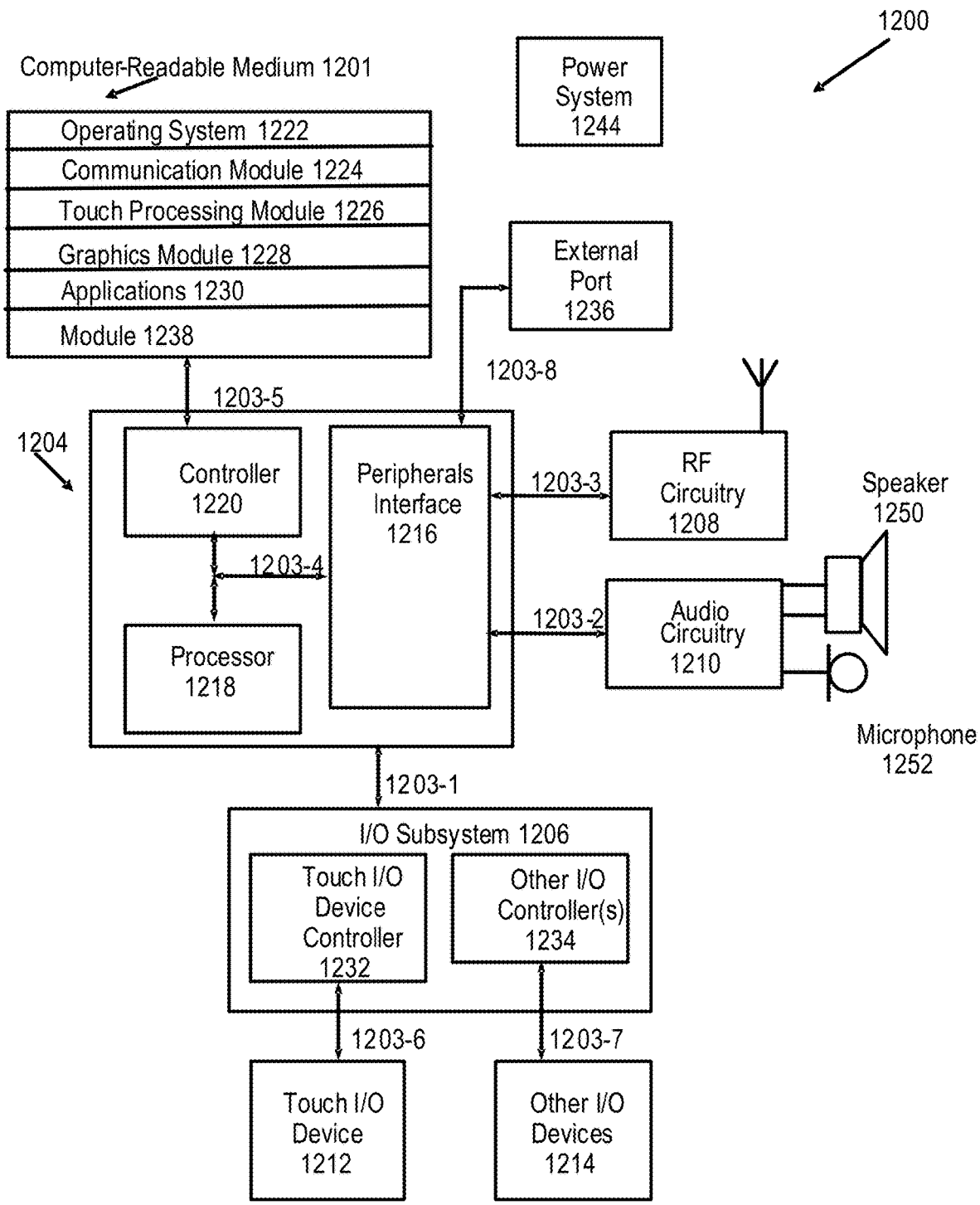
FIG. 12 is a block diagram of an exemplary architecture for a device having touch I/O capabilities.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 1200, including combinations of two or more of these types of devices. FIG. 12 is a block diagram of one embodiment of system 1200 that generally includes one or more computer-readable media 1201, processing system 1204, Input/Output (I/O) subsystem 1206, radio frequency (RF) circuitry 1208 and audio circuitry 1210. These components may be coupled by one or more communication buses or signal lines 1203.

It should be apparent that the architecture shown in FIG. 12 is only one example architecture of system 1200, and that system 1200 could have more or fewer components than shown, or a different configuration of components. The various components shown in FIG. 12 can be implemented in hardware, software, firmware or any combination thereof, including one or more signal processing and/or application specific integrated circuits.

RF circuitry 1208 is used to send and receive information over a wireless link or network to one or more other devices and includes well-known circuitry for performing this function. RF circuitry 1208 and audio circuitry 1210 are coupled to processing system 1204 via peripherals interface 1216. Interface 1216 includes various known components for establishing and maintaining communication between peripherals and processing system 1204. Audio circuitry 1210 is coupled to audio speaker 1250 and microphone 1252 and includes known circuitry for processing voice signals received from interface 1216 to enable a user to communicate in real-time with other users. In some embodiments, audio circuitry 1210 includes a headphone jack (not shown).

Peripherals interface 1216 couples the input and output peripherals of the system to processor 1218 and computer-readable media 1201. One or more processors 1218 communicate with one or more computer-readable media 1201 via controller 1220. Computer-readable media 1201 can be any device or medium that can store code and/or data for use by one or more processors 1218. Media 1201 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Media 1201 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SRNs), Metropolitan Area Networks (MAN) and the like.

One or more processors 1218 run various software components stored in medium 1201 to perform various functions for system 1200. In some embodiments, the software components include operating system 1222, communication module (or set of instructions) 2024, touch processing module (or set of instructions) 1226, graphics module (or set of instructions) 1228, one or more applications (or set of instructions) 1230, and avatar editing module 1238. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 1201 may store a subset of the modules and data structures identified above. Furthermore, medium 1201 may store additional modules and data structures not described above.

Operating system 1222 includes various procedures, sets of instructions, software components and/or drivers for controlling and managing general system tasks (e.g., memory management, storage device control, power management, etc.) and facilitates communication between various hardware and software components.

Communication module 1224 facilitates communication with other devices over one or more external ports 1236 or via RF circuitry 1208 and includes various software components for handling data received from RF circuitry 1208 and/or external port 1236.

Graphics module 1228 includes various known software components for rendering, animating and displaying graphical objects on a display surface. In embodiments in which touch I/O device 1212 is a touch sensitive display (e.g., touch screen), graphics module 1228 includes components for rendering, displaying, and animating objects on the touch sensitive display.

One or more applications 1230 can include any applications installed on system 1200, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 1226 includes various software components for performing various tasks associated with touch I/O device 1212 including but not limited to receiving and processing touch input received from I/O device 1212 via touch I/O device controller 1232.

System 1200 may further include avatar editing module 1238 for performing the method/functions as described herein in connection with FIGS. 1-7. Avatar editing module 1238 may at least function to provide the avatar editing environment described with respect to FIGS. 1-7. Avatar editing module 1238 may also interact with other elements of system 1200 to provide the avatar editing functions. Avatar editing module 1238 may be embodied as hardware, software, firmware, or any combination thereof. Although module 1238 is shown to reside within medium 1201, all or portions of module 1238 may be embodied within other components within system 1200 or may be wholly embodied as a separate component within system 1200.

I/O subsystem 1206 is coupled to touch I/O device 1212 and one or more other I/O devices 1214 for controlling or performing various functions. Touch I/O device 1212 communicates with processing system 1204 via touch I/O device controller 1232, which includes various components for processing user touch input (e.g., scanning hardware). One or more other input controllers 1234 receives/sends electrical signals from/to other I/O devices 1214. Other I/O devices 1214 may include physical buttons, dials, slider switches, sticks, keyboards, touch pads, additional display screens, or any combination thereof.

If embodied as a touch screen, touch I/O device 1212 displays visual output to the user in a GUI. The visual output may include text, graphics, video, and any combination thereof. Some or all of the visual output may correspond to user-interface objects. Touch I/O device 1212 forms a touch-sensitive surface that accepts touch input from the user. Touch I/O device 1212 and touch screen controller 1232 (along with any associated modules and/or sets of instructions in medium 1201) detects and tracks touches or near touches (and any movement or release of the touch) on touch I/O device 1212 and converts the detected touch input into interaction with graphical objects, such as one or more user-interface objects. In the case in which device 1212 is embodied as a touch screen, the user can directly interact with graphical objects that are displayed on the touch screen. Alternatively, in the case in which device 1212 is embodied as a touch device other than a touch screen (e.g., a touch pad), the user may indirectly interact with graphical objects that are displayed on a separate display screen embodied as I/O device 1214.

Touch I/O device 1212 may be analogous to the multi-touch sensitive surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 1202/0015024A1, each of which is hereby incorporated by reference.

Embodiments in which touch I/O device 1212 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 1212 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 1200 also includes power system 1244 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 1216, one or more processors 1218, and memory controller 1220 may be implemented on a single chip, such as processing system 1204. In some other embodiments, they may be implemented on separate chips.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An electronic device, comprising:
a touch-sensitive display;
one or more processors; and
memory storing one or more programs configured to be executed by the one or more processors, the one or more programs including instructions for:
displaying, via the touch-sensitive display, an avatar editing environment, wherein displaying the avatar editing environment includes concurrently displaying, within the avatar editing environment:
a representation of an avatar having a plurality of selected avatar elements; and
a first affordance;
detecting selection of the first affordance;
in response to detecting selection of the first affordance, displaying, within the avatar editing environment, a plurality of color options for a category of avatar elements; and
after detecting selection of a first color option that corresponds to a first color, displaying, within the avatar editing environment, a plurality of element options for the category of avatar elements having the first color.

2. The electronic device of claim 1, wherein the plurality of selected avatar elements includes a first avatar element selected from the category of avatar elements.

3. The electronic device of claim 2, wherein, prior to detecting selection of the first color option, the first avatar element is displayed having a second color different than the first color.

4. The electronic device of claim 1, wherein the plurality of element options for the category of avatar elements includes a first element option corresponding to the representation of the avatar having the plurality of selected avatar elements.

5. The electronic device of claim 1, wherein the plurality of element options for the category of avatar elements is displayed in response to a selection of a second affordance different from the first affordance.

6. The electronic device of claim 1, the one or more programs further including instructions for:
prior to detecting selection of the first color option, displaying, within the avatar editing environment, the plurality of element options for the category of avatar elements having a first set of colors, wherein the first set of colors includes one or more colors different than the first color.

7. The electronic device of claim 1, wherein displaying the plurality of color options for the category of avatar elements includes:
in accordance with a determination that the category of avatar elements corresponds to a first category of avatar elements, displaying a first set of color options corresponding to the first category of avatar elements; and
in accordance with a determination that the category of avatar elements corresponds to a second category of avatar elements different from the first category of avatar elements, displaying a second set of color options corresponding to the second category of avatar elements and different from the first set of color options.

8. The electronic device of claim 7, wherein:
the first category of avatar elements is an avatar nose category,
the first set of color options include skin tone color options,
the second category of avatar elements is an avatar eyes category, and
the second set of color options include eye color options.

9. A non-transitory computer-readable storage medium storing one or more programs configured to be executed by one or more processors of an electronic device with a touch-sensitive display, the one or more programs including instructions for:
displaying, via the touch-sensitive display, an avatar editing environment, wherein displaying the avatar editing environment includes concurrently displaying, within the avatar editing environment:
a representation of an avatar having a plurality of selected avatar elements; and
a first affordance;
detecting selection of the first affordance;
in response to detecting selection of the first affordance, displaying, within the avatar editing environment, a plurality of color options for a category of avatar elements; and
after detecting selection of a first color option that corresponds to a first color, displaying, within the avatar editing environment, a plurality of element options for the category of avatar elements having the first color.

10. The non-transitory computer-readable storage medium of claim 9, wherein the plurality of selected avatar elements includes a first avatar element selected from the category of avatar elements.

11. The non-transitory computer-readable storage medium of claim 10, wherein, prior to detecting selection of the first color option, the first avatar element is displayed having a second color different from the first color.

12. The non-transitory computer-readable storage medium of claim 9, wherein the plurality of element options for the category of avatar elements includes a first element option corresponding to the representation of the avatar having the plurality of selected avatar elements.

13. The non-transitory computer-readable storage medium of claim 9, wherein the plurality of element options for the category of avatar elements is displayed in response to a selection of a second affordance different from the first affordance.

14. The non-transitory computer-readable storage medium of claim 9, the one or more programs further including instructions for:
prior to detecting selection of the first color option, displaying, within the avatar editing environment, the plurality of element options for the category of avatar elements having a first set of colors, wherein the first set of colors includes one or more colors different than the first color.

15. The non-transitory computer-readable storage medium of claim 9, wherein displaying the plurality of color options for the category of avatar elements includes:
in accordance with a determination that the category of avatar elements corresponds to a first category of avatar elements, displaying a first set of color options corresponding to the first category of avatar elements; and
in accordance with a determination that the category of avatar elements corresponds to a second category of avatar elements different from the first category of avatar elements, displaying a second set of color options corresponding to the second category of avatar elements and different from the first set of color options.

16. The non-transitory computer-readable storage medium of claim 15, wherein:
the first category of avatar elements is an avatar nose category,
the first set of color options include skin tone color options,
the second category of avatar elements is an avatar eyes category, and
the second set of color options include eye color options.

17. A method, comprising:
at an electronic device having a touch-sensitive display:
displaying, via the touch-sensitive display, an avatar editing environment, wherein displaying the avatar editing environment includes concurrently displaying, within the avatar editing environment:
a representation of an avatar having a plurality of selected avatar elements; and
a first affordance;
detecting selection of the first affordance;
in response to detecting selection of the first affordance, displaying, within the avatar editing environment, a plurality of color options for a category of avatar elements; and
after detecting selection of a first color option that corresponds to a first color, displaying, within the avatar editing environment, a plurality of element options for the category of avatar elements having the first color.

18. The method of claim 17, wherein the plurality of selected avatar elements includes a first avatar element selected from the category of avatar elements.

19. The method of claim 18, wherein, prior to detecting selection of the first color option, the first avatar element is displayed having a second color different than the first color.

20. The method of claim 17, wherein the plurality of element options for the category of avatar elements includes a first element option corresponding to the representation of the avatar having the plurality of selected avatar elements.

21. The method of claim 17, wherein the plurality of element options for the category of avatar elements is displayed in response to a selection of a second affordance different from the first affordance.

22. The method of claim 17, further comprising:
prior to detecting selection of the first color option, displaying, within the avatar editing environment, the plurality of element options for the category of avatar elements having a first set of colors, wherein the first set of colors includes one or more colors different than the first color.

23. The method of claim 17, wherein displaying the plurality of color options for the category of avatar elements includes:
in accordance with a determination that the category of avatar elements corresponds to a first category of avatar elements, displaying a first set of color options corresponding to the first category of avatar elements; and
in accordance with a determination that the category of avatar elements corresponds to a second category of avatar elements different from the first category of avatar elements, displaying a second set of color options corresponding to the second category of avatar elements and different from the first set of color options.

24. The method of claim 23, wherein:

the first category of avatar elements is an avatar nose category, the first set of color options include skin tone color options, the second category of avatar elements is an avatar eyes category, and the second set of color options include eye color options.

\* \* \* \* \*

UNITED STATES PATENT AND TRADEMARK OFFICE
CERTIFICATE OF CORRECTION

| | | |
|---|---|---|
| PATENT NO. | : 11,481,988 B2 | |
| APPLICATION NO. | : 16/833436 | |
| DATED | : October 25, 2022 | |
| INVENTOR(S) | : Marcel Van Os et al. | |

It is certified that error appears in the above-identified patent and that said Letters Patent is hereby corrected as shown below:

On the Title Page

Column 2, Line 3, Item (56), in Other Publications, delete "htpps" and insert -- https: --, therefor.

Signed and Sealed this
Fourteenth Day of February, 2023

*Katherine Kelly Vidal*

Katherine Kelly Vidal
*Director of the United States Patent and Trademark Office*